(12) United States Patent
Laramay et al.

(10) Patent No.: US 7,947,745 B1
(45) Date of Patent: May 24, 2011

(54) REDUCING THE VISCOSITY OF AN AQUEOUS FLUID

(75) Inventors: Steven B. Laramay, Mesquite, TX (US); Charles George, Wylie, TX (US); Henry A. Pfeffer, III, Mercerville, NJ (US)

(73) Assignees: Fritz Industries, Inc, Dallas, TX (US); FMC Corporation, Philadelphia, PA (US)

( * ) Notice: Subject to any disclaimer, the term of this patent is extended or adjusted under 35 U.S.C. 154(b) by 788 days.

(21) Appl. No.: 11/973,496

(22) Filed: Oct. 9, 2007

(51) Int. Cl.
*C09K 3/00* (2006.01)
*C08B 37/00* (2006.01)
*C09K 8/68* (2006.01)
*E21B 43/27* (2006.01)
*E21B 43/26* (2006.01)

(52) U.S. Cl. ........ 516/113; 507/209; 507/211; 166/300; 166/308.3; 166/295; 536/114

(58) Field of Classification Search .................. 516/113; 507/209, 211; 166/300, 303.3, 295, 308.3; 536/114
See application file for complete search history.

(56) References Cited

U.S. PATENT DOCUMENTS

| | | | | | |
|---|---|---|---|---|---|
| 1,953,398 | A | * | 4/1934 | Eskew | 536/41 |
| 2,483,936 | A | * | 10/1949 | Roberts | 507/110 |
| 2,512,338 | A | * | 6/1950 | Klug et al. | 536/97 |
| 2,767,167 | A | * | 10/1956 | Opie et al. | 536/114 |
| 3,167,510 | A | | 1/1965 | Alter | |
| 3,251,768 | A | * | 5/1966 | Walker | 507/110 |
| 3,728,331 | A | * | 4/1973 | Savage | 536/88 |
| 3,734,189 | A | * | 5/1973 | Gogarty | 166/308.4 |
| 4,552,674 | A | * | 11/1985 | Brown et al. | 507/211 |
| 5,253,711 | A | | 10/1993 | Mondshine | 166/300 |
| 5,607,905 | A | | 3/1997 | Dobson, Jr. et al. | 507/211 |
| 5,783,526 | A | | 7/1998 | Dobson, Jr. et al. | 507/261 |
| 5,783,527 | A | | 7/1998 | Dobson, Jr. et al. | 507/269 |
| 5,950,731 | A | * | 9/1999 | Shuchart et al. | 166/300 |
| 6,924,254 | B2 | * | 8/2005 | Todd | 507/268 |
| 7,179,485 | B1 | | 2/2007 | Schneider et al. | 424/451 |
| 2005/0211435 | A1 | * | 9/2005 | Monroe et al. | 166/292 |
| 2005/0227874 | A1 | * | 10/2005 | Berger et al. | 507/211 |
| 2008/0176770 | A1 | * | 7/2008 | Sanders et al. | 507/213 |

FOREIGN PATENT DOCUMENTS

| | | |
|---|---|---|
| EP | 0 559 418 B1 | 8/1993 |
| EP | 0 579 466 A3 | 1/1994 |
| EP | 0 672 740 B1 | 9/1995 |
| EP | 0 875 660 B1 | 11/1998 |

OTHER PUBLICATIONS

Kirk Othmer Encyclopedia of Chemical Technology, "Peroxides and Peroxide Compounds, Inorganic Peroxides", Norbert Steiner and Wilfried Eul, Degussa AG, © 2001 by John Wiley & Sons, Inc. (Article Online Posting Date: Jul. 13, 2001) Online @ http://mrw.interscience.wiley.com/emrw/9780471238966/kirk/article/inorcomy.a01/current, pp. 1-35.*
Ullmann's Encyclopedia of Industrial Chemistry, "Peroxo Compounds, Inorganic", Harald Jakob et al, Degussa GmbH, Hanau & Pullach, Germany © 2007 by Wiley-VCH Verlag GmbH & Co. KGaA, (Posting Date: Jul. 15, 2007), online @ http://mrw.interscience.wiley.com/emrw/9783527306732/ueic/article/a19_177/current/html?hd=All,peroxide , pp. 1-33.*

* cited by examiner

*Primary Examiner* — Daniel S Metzmaier
(74) *Attorney, Agent, or Firm* — Thomas R. Weaver

(57) ABSTRACT

An aqueous fluid having a viscosity greater than the viscosity of water is contacted with a water soluble material for a time and at a temperature sufficient to reduce the viscosity of the aqueous fluid to a value which is less than about 10 percent of the initial viscosity of the aqueous fluid. The water soluble material is an alkali metal peroxide or a combination of an alkali metal peroxide and a transition metal-containing compound.

15 Claims, No Drawings

REDUCING THE VISCOSITY OF AN AQUEOUS FLUID

BACKGROUND OF THE INVENTION

1. Technical Field of the Invention

This invention relates to viscous aqueous liquids and, more specifically, to the reduction of the viscosity of viscous aqueous liquids. In one aspect, the invention relates to the reduction of the viscosity of viscous aqueous liquids introduced into fractures formed in subsurface earth formations.

2. Description of the Prior Art and Problems Solved

It is known in the art to add a solvatable, organic polymeric material, such as a polysaccharide, to an aqueous liquid to form a liquid colloidal dispersion referred to as a sol. It is further known in the art to add a reactant to the sol which, it is believed, causes the dispersed colloidal particles in the sol to form connections to produce a product referred to as a gel. The reactant is conventionally referred to as a cross-linking agent, or, more simply, as a cross linker. The formation of the sol upon addition of the polysaccharide to the aqueous liquid is accompanied by an increase in the viscosity of the aqueous liquid. Addition of a cross linker to the sol causes a further increase in the viscosity of the aqueous liquid.

In that branch of the petroleum producing arts which features the recovery of hydrocarbons from a subsurface formation, a "sol" is conventionally referred to as a "gel" and the hydrophillic polymer is conventionally referred to as a "gelling agent." The product produced by addition of the reactant to the "sol" is conventionally referred to as a cross-linked gel. The petroleum arts terminology is employed in this disclosure.

Petroleum hydrocarbons are known to occur in the pores of identified subterranean formations. Accordingly, hydrocarbons are recovered from the pore spaces through a borehole drilled from the surface of the earth which penetrates an identified formation. Petroleum flows from the pores through the formation to the borehole and then to the surface. For a variety of reasons the rate of flow of hydrocarbons through a formation can be unsatisfactorily low. The art has, thus, developed a number of stimulation processes for increasing the rate of flow. Hydraulic fracturing is one such stimulation process, and features the use of an aqueous liquid under pressure to form a crack in the formation through which formation fluids, such as liquid hydrocarbons, can flow toward the borehole.

In brief, hydraulic fracturing, referred to herein as fracturing, involves the intentional increase of hydraulic pressure within the borehole at the intersection of the borehole and the formation, i.e., the formation face. At some time during the increase of the pressure at the formation face the pressure becomes sufficiently high to overcome the mechanical ability of the formation to resist the applied pressure. At that point, called breakdown, a crack opens in the formation and the hydraulic fluid, i.e., the fracturing fluid, such as water, flows into the crack causing the crack to increase in width and extend into the formation. So long as sufficient pressure is maintained on the fluid it will operate to prevent the crack from closing.

The stated purpose of hydraulic fracturing is to increase the rate of flow of hydrocarbons from the formation within the formed fracture toward the borehole. It is, therefore, necessary to reduce the applied pressure within the fracture to permit the desired fluid flow. However, a reduction in applied pressure will not result in a sufficient rate of flow if the fracture closes when the applied pressure is reduced. The art has solved the closure problem by the step of placing a solid material, referred to in the art as a proppant, into the formed fracture. The proppant functions to mechanically hold, i.e., prop, the crack open upon reduction of applied pressure. The proppant is suspended in a gel or a cross-linked gel which transports the proppant to and places the proppant in the formed fracture.

In the performance of a fracturing process, it is preferred that the viscosity of the fracturing fluid be sufficiently high to suspend the proppant in the fluid while it is being transported to the formation, but low enough to minimize surface pumping pressure while pressure at the formation face is being increased. In contrast, at the moment when the fracture occurs, i.e., breakdown, it is ideally preferred that the viscosity of the fluid immediately increase to a maximum value as the crack widens and lengthens, and that the viscosity remain at the maximum value to thereby suspend the proppant in the fracture while applied pressure declines and the fracture closes on the proppant.

With applied pressure reduced, accompanied by closure of the fracture on the proppant, it is necessary to reduce the viscosity of the viscous aqueous liquid so that it can flow from the fracture to enable the hydrocarbons in the formation to flow in the fracture to the borehole. The art has developed, and continues to develop, materials and methods of using the materials which operate on the gel and cross-linked gel to reduce the viscosity of the viscous aqueous liquid.

THE INVENTION

1. Summary of the Invention

This invention provides a material and a method of using the material to reduce the viscosity of a viscous fluid. For purposes of this disclosure the phrase "viscous fluid" shall mean an aqueous gel and shall also mean an aqueous cross-linked gel. According to the method, the material is placed in contact with the viscous fluid wherein the viscosity of the viscous fluid is greater than the viscosity of water. The contact between the material and the viscous fluid is maintained for a time and at a temperature sufficient to reduce the viscosity of the viscous fluid to a value which is a small fraction of the initial viscosity of the viscous fluid. For purposes of the invention the phrase, "small fraction of the initial viscosity of the viscous fluid" means a viscosity which is equal to or less than about 10 percent of the initial viscosity of the viscous fluid. Such a viscosity, particularly with regard to a hydraulic fracturing fluid, would be very close, or substantially equal, to the viscosity of water.

It has been discovered that the material employed in the method of this invention operates to decrease the viscosity of a viscous fluid, and that the rate of such viscosity reduction is a function of contact temperature, contact time, the nature of the material and the concentration of the material in the viscous fluid. Accordingly, at contact temperatures in the range of from about room temperature to about 180° F. the initial viscosity of a viscous fluid can be reduced to a small fraction of the initial viscosity of the viscous fluid within a period of from about 25 minutes to about 11 days by contacting the viscous fluid with a material having a specified nature and a specified concentration relative to the viscous fluid. This invention thus provides a versatile method of reducing the viscosity of a viscous fluid in accordance with the time and/or temperature parameters of a particular user.

The material used in the method of this invention is soluble in water, and is one of either a first composition or a second composition. The first composition is comprised of an alkali metal peroxide. The second composition is comprised of a combination of the first composition and a metal-containing compound, wherein the metal in the metal-containing compound is selected from transition metals, particularly chromium (II), chromium (III), manganese (II), iron (II), iron (III), cobalt (II), nickel (II), copper (II) and zinc (II). The metal-containing compound can be a metal salt or a metal chelate. Accordingly, the chemical nature of the material employed in the method of the invention is either an alkali metal peroxide or a combination of an alkali metal peroxide and a compound containing a transition metal.

The first composition is sometimes referred herein to as a breaker, and the metal-containing compound is sometimes referred to herein as a breaker activator. The second composition, i.e., the combination of the first composition and the metal-containing compound, is also sometimes referred to herein as a breaker system.

2. Description of the Preferred Embodiments

It is known that the viscosity of a viscous fluid can be reduced by contacting the viscous fluid with hydrogen peroxide. It is believed that the hydrogen peroxide decomposes in the presence of the viscous fluid to form an oxidizing agent known as a hydroxyl radical, and that it is the formed oxidizing agent which actually operates to reduce the viscosity of the viscous fluid. In this connection it is believed that hydroxyl radicals oxidize and, thus, destroy the linkages in polysaccharide and cross linked polysaccharide molecules, which destruction causes the reduction in viscosity of the viscous fluid. It is also known that one molecule of hydrogen peroxide can produce two hydroxyl radicals. It is believed that the rate of reduction of viscosity is a function of the concentration of the hydrogen peroxide, and, thus, of the hydroxyl radicals, present in the viscous fluid.

In view of the above, it would seem apparent to reduce the viscosity of a viscous fluid by merely contacting the fluid with hydrogen peroxide. However, hydrogen peroxide is difficult, if not dangerous, to handle because it may violently decompose. In this regard, it is believed that the rate of decomposition of hydrogen peroxide is accelerated when it is exposed to elevated temperatures, and also when it is in contact with metallic impurities.

This invention provides a method of using hydrogen peroxide without actually handling quantities of hydrogen peroxide by employing a material which, upon contact with a viscous fluid, produces hydrogen peroxide and, ultimately, hydroxyl radicals. Accordingly, the first composition, that is, the breaker, is a water soluble alkali metal peroxide, preferably lithium peroxide. It is believed that lithium peroxide, upon dissolution in water, forms hydrogen peroxide which in turn, by the accelerating influence of temperature or a combination of temperature and chemical activation, decomposes to form hydroxide radicals. It is, accordingly, believed that using a water soluble alkali metal peroxide as the source of hydrogen peroxide provides a commercially practical, and safe alternative to the direct handling of hydrogen peroxide.

Sodium peroxide and potassium peroxide are also water soluble alkali metal peroxides. However, they, like hydrogen peroxide, are believed to be unstable and dangerous to handle. Thus, sodium peroxide and potassium peroxide may not be useful within the context of a method of reducing the viscosity of a viscous fluid. Indeed, in view of the chemical similarities of lithium peroxide, sodium peroxide and potassium peroxide, it is surprising that any alkali metal peroxide would be useful herein. The discovery of the utility of lithium peroxide is surprising and unexpected.

It has been discovered that the viscosity of a viscous fluid declines when the fluid is contacted by dissolved lithium peroxide at temperatures equal to or in excess of room temperature, and that the rate of viscosity decline increases as the weight ratio of gelling agent to breaker decreases. In this connection, it is believed that the quantity of available hydrogen peroxide is increased by increasing the weight of lithium peroxide relative to the weight of gelling agent in the viscous fluid. Accordingly, an increase in the weight of dissolved lithium peroxide relative to gelling agent produces a decline in weight ratio of gelling agent to breaker.

If the contact temperature is in the range of from about room temperature to about 100° F., then, even after a period of contact of about 21 hours, the value of the reduced viscosity remains substantially greater than about 10 percent of the initial viscosity of the viscous fluid. In this regard, the value of the reduced viscosity is not reduced to a value which is less than about 10 percent of the initial viscosity of the viscous fluid until the contact time is in the range of from about 216 to about 257 hours wherein the weight ratio of gelling agent to breaker is in the range of from about 25 to about 60 weight parts gelling agent per 1 weight part breaker.

In contrast, if the contact temperature is equal to about 150° F., then, depending upon the weight ratio of gelling agent to breaker, the viscosity of the viscous fluid can be reduced to a value which is less than about 10 percent of the initial viscosity within a contact time in the range of from about 50 minutes to about 21 hours wherein the weight ratio of gelling agent to breaker is an amount in the range of from about 7.3 to about 584 weight parts gelling agent per 1 weight part breaker.

At a given temperature, decline in viscosity increases as the ratio of gelling agent to breaker decreases. Stated differently, at constant temperature, the rate of viscosity reduction increases as the ratio of breaker to gelling agent increases. Accordingly, it is concluded that temperature increase and breaker concentration increase are important variables accountable for the acceleration of the formation of hydroxyl radicals from available hydrogen peroxide produced by dissolving lithium peroxide in water.

It has been discovered that the viscosity of a viscous fluid declines when the fluid is contacted by a combination of dissolved lithium peroxide and a dissolved metal-containing compound at temperatures equal to or in excess of room temperature, and that the rate of viscosity decline increases as the weight ratio of gelling agent to breaker decreases and as the weight ratio of metal in the metal-containing compound to breaker increases. In this connection, it is believed that the quantity of available hydrogen peroxide is increased by increasing the weight of lithium peroxide relative to the weight of gelling agent in the viscous fluid, and that the rate of formation of hydroxyl radicals is increased by increasing contact temperature and by increasing the weight of metal in solution relative to the weight of breaker in solution.

The particular metal species employed in the method has an effect on the rate of decline of viscosity. Thus, If: (1) the metal in the metal-containing compound is a transition metal selected from any one of copper, iron, manganese and cobalt; (2) the contact temperature is constant at about 100° F.; (3) the weight ratio of gelling agent to breaker is about 30 weight parts gelling agent per 1 weight part breaker and; (4) the weight ratio of metal in solution to breaker in solution is in the range of from about 1.5 to about $50 \times 10^{-3}$ weight parts metal per 1 weight part of breaker, then the contact time required to reduce the value of the viscosity of the viscous fluid to a value in the range of from about 10 percent of the initial viscosity of the viscous fluid to a value which is substantially greater than about 10 percent of the initial viscosity of the viscous fluid ranges from about 28 minutes to a time in excess of about 21 hours. If the metal is not iron, then the viscosity of the fluid is not reduced to a value which is less than about 10 percent of the initial viscosity of the viscous fluid within a period of contact of about 21 hours. However, if the metal is iron, then the viscosity of the fluid is reduced to a value which is less than about 10 percent of the initial viscosity of the viscous fluid within a period of contact in the range of from about of 28 minutes to about 20 hours.

Accordingly, at constant temperature and constant ratio of gelling agent to breaker, it is believed that a transition metal, when in combination with the breaker, is an important variable accountable for the acceleration of the formation of hydroxyl radicals from hydrogen peroxide produced from lithium peroxide dissolved in water, and, further, that iron causes the most rapid formation of hydroxyl radicals.

It has been discovered that the viscosity of a viscous fluid can be reduced to value which is less than about 10 percent of the initial viscosity of the viscous fluid within a contact time in the range of from about 50 minutes to about 18 hours by contacting the viscous fluid with various combinations of lithium peroxide, iron(II) and a gelling agent at temperatures in the range of from about 75° to about 125° F. These results were observed for weight ratios of gelling agent to lithium peroxide in the range of from about 7.3 to about 582.9 weight parts gelling agent per 1 weight part lithium peroxide, and for weight ratios of iron(II) to lithium peroxide in the range of from about $0.6 \times 10^{-3}$ to about $202.2 \times 10^{-3}$ weight parts iron (II) per 1 weight part lithium peroxide. This discovery revealed that the highest contact temperature (125° F.) required the lowest iron(II) to breaker ratio and the lowest guar to breaker ratio, and that the lowest contact temperature (75° F.) required the highest iron(II) to breaker ratio and the highest guar to breaker ratio.

It is thus clear that breaker concentration, metal species and metal concentration play important roles in the rate at which the viscosity of a viscous fluid can be reduced upon being contacted by an aqueous solution of a breaker or a breaker system at a specified contact temperature. In general, acceptable viscosity reduction can be obtained at high contact temperature and a range of breaker concentrations with no metal. Also, in general, acceptable viscosity reduction can be obtained at low contact temperature and a range of breaker concentrations in combination with various metal species in a range of concentrations.

The invention provides to a person skilled in the art a method of reducing the viscosity of a viscous fluid consistent with the constraints of time and the reality of contact temperature.

As previously mentioned, the material used in the method of this invention to reduce the viscosity of a viscous fluid is soluble in water, and is one of either a first composition or a second composition.

The first composition is preferably lithium peroxide, an alkali metal peroxide, which is sometimes referred to herein as the breaker. According to the method of the invention, the breaker, preferably in solid phase, is mixed with a gel or a cross linked gel. The breaker, upon being mixed with the viscous fluid, dissolves in the water phase of the viscous fluid to thereby, it is believed, form hydrogen peroxide. It is further believed that the formed hydrogen peroxide produces hydroxyl radicals which oxidize linkages in polysaccharide and cross linked polysaccharide molecules in the viscous fluid, which results in the reduction in viscosity of the viscous fluid.

It is believed that the rate at which viscosity is decreased depends upon at least two variables. One of the variables is the quantity of hydrogen peroxide relative to the quantity of gelling agent. The second variable is the time required to produce hydroxyl radicals from the available hydrogen peroxide.

The quantity of hydrogen peroxide relative to the quantity of gelling agent is controlled by the quantity of the source of the hydrogen peroxide, that is, the breaker, relative to the quantity of gelling agent. In this regard, the quantity of gelling agent employed is largely a matter of choice of a practitioner who is desirous of a viscous fluid having a viscosity which is suited to a particular purpose. For example, fracturing service providers have found it convenient to employ a polysaccharide, such as guar gum, in an amount in the range of from about 25 to about 60 pounds of guar per 1000 gallons of an aqueous salt solution, such as a solution containing about 2 pounds of potassium chloride per 100 pounds of water.

In one design scenario of a typical fracturing service, a practitioner, after establishing the quantity of gelling agent required to produce a viscous fluid having a desired viscosity, may then determine (or estimate by known means) the temperature to which the viscous fluid will be exposed and then, in view of the contemplated temperature, establish the desired length of time required to reduce the viscosity of the viscous fluid to a value which is approximately equal to the viscosity of the initial salt solution. The established length of time is referred to in the fracturing art, and herein, as a break schedule. After having established the desired break schedule, a person skilled in the art can, in accordance with the above described parameters, utilize the quantity of breaker or the quantity of breaker and metal-containing compound which will operate to produce the desired break schedule.

A person skilled in the art can refer to examples 1-8, and particularly to examples 2-8, to obtain guidance in the design of a break schedule. These examples illustrate break schedules which can be obtained by utilizing various concentrations of breaker relative to gelling agent and various concentrations of metal relative to breaker. Table 9 is a compilation of data from examples 1-8. Table 10 is a more specific compilation of data pertaining to combinations of lithium peroxide, iron metal and gelling agent from examples 2-7, wherein the weight ratio of gelling agent to breaker is about 30 weight parts gelling agent per 1 weight part breaker, the weight ratio of iron to breaker is an amount the range of from about $1.57 \times 10^{-3}$ to about $50.05 \times 10^{-3}$ weight parts metal per 1 weight part breaker and the contact temperature is about 100° F.

The data compilation contained in Table 10 is divided into three categories. The columns headed "fn 2" contain data from examples 2-5. The columns headed "fn 3" contain data from example 6. The columns headed "fn 4" contain data from example 7. In the "fn 2" columns the iron is placed in contact with the viscous fluid in the form of a solid dissolved in an aqueous solution. In the "fn 3" columns the iron is placed in contact with the viscous fluid in the form of a water soluble solid deposited on a water-insoluble substrate. In the "fn 4" columns the iron is placed in contact with the viscous fluid in the form of a solid dissolved in an aqueous solution, wherein the viscous fluid is a cross-linked gel. It is evident that the metal when initially in solution form reduced viscosity at a rate faster than the metal when initially in solid form. The metal when initially in solution form appeared to reduce the viscosity of a gel which was not cross-linked at a higher rate than it did when the viscous fluid was a cross-linked gel, but the guar to breaker ratio in the cross-linked gel in example 7 was a factor of 2 greater than the ratio in the compared examples in fn 2.

The various metals previously referred to are supplied by compounds which contain such metals. Furthermore, the metal concentrations referred to are supplied by quantities of metal compounds sufficient to supply the metals. Persons skilled in the art can, by performance of well known procedures, calculate the quantity of metal-containing compound sufficient to supply the necessary metal concentrations.

The metal-containing compound employed in the second composition is referred to as a breaker activator. The breaker activator can be a metal salt or a metal chelate, wherein the metal in the salt or chelate is a transition metal preferably chromium (II), chromium (III), manganese (II), iron (II), iron (III), cobalt (II), nickel (II), copper (II) or zinc (II). Preferred metal salts are cupric sulfate pentahydrate ($CuSO_4 \cdot 5H_2O$), ferric chloride ($FeCl_3$), ferrous sulfate heptahydrate ($FeSO_4 \cdot 7H_2O$), manganous chloride quatrahydrate ($MnCl_2 \cdot 4H_2O$) and cobaltous chloride hexahydrate ($CoCl_2 \cdot 6H_2O$).

The metal salts can be directly combined with the breaker to produce the breaker system. However, to function as desired, the metal must be stable, that is, it must remain in solution as the metal ion. Accordingly, to stabilize the metal, the breaker activator is preferably employed in the form of a metal chelate which is made by reacting the metal salt with a suitable chelating agent.

Examples of chelating agents useful herein include amino acids, α-hydroxy-carboxylic acids and amino phosphonic acids. Examples of amino acids are glycine, ethylenediaminetetraacetic acid (EDTA), nitrilotriacetic acid (NTA) and 1,2-diaminocyclohexane-N,N,N',N'-tetracetic acid ($H_4CyDTA$). Examples of α-hydroxy-carboxylic acids are lactic acid, citric acid and gluconic acid. Examples of amino phosphonic acids are aminotrimethylenephosphonic acid and diethyenetriaminepentamethylenephosphonic acid. Salts and partial salts of these acids can also be used, examples of which include tetrasodium EDTA, trisodium EDTA, disodium EDTA and monosodium EDTA.

As mentioned, breaker activators, in the form of metal chelates, can be made by reacting a suitable metal salt with a suitable chelating agent. For example, a breaker activator, referred to as BA, useful herein is the reaction product of the tetrasodium salt of ethylenediaminetetra acetic acid ($Na_4EDTA$), referred to herein as the EDTA salt, and a metal-containing salt. The desired reaction product, the breaker activator, has the general formula $$M_y Na_x EDTA \qquad \text{(Formula 1)}.$$

Formula 1 represents the desired reaction product of the reaction between reactant $R_m$, the metal-containing salt, and reactant R1, the EDTA salt, to produce breaker activator, BA. Equation 1, below, describes the reaction between reactant $R_m$ and reactant R1.

wherein:
$R_m$ is $[(M^n Z^b) \cdot B(H_2O)]$
R1 is $[Na_4(EDTA)]$

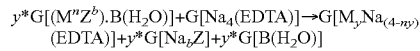

$[Na_b Z]$ is a salt consisting of sodium and the anion "Z" in $R_m$
$B(H_2O)$ is the water of hydration, if any, in $R_m$
y is the stoichiometric amount of the metal "M" in BA, and is also the ratio of the moles of $R_m$ to the moles of R1
b is the valence of the anion "Z" in $R_m$
n is the valence of the metal "M" in $R_m$ and BA
B is the number of moles of the water of hydration in $R_m$
G is the number of moles of R1 and is also the number of moles of BA The subscript, y, in Formula 1 and in Equation 1, i.e., the stoichiometric quantity of the metal "M", has a value in the range of from about 0.25 to about 2.0, and more preferably in the range of from about 0.25 to about 1.0. The stoichiometric quantity, x, of sodium is a function of the product of y and n. Accordingly, x is theoretically determined by subtracting the product of n and y from 4, the valence of EDTA, i.e. x=4−ny. For example, if "M" is Fe having a valence of +2, and the stoichiometric quantity, y, is 0.75, then the stoichiometric quantity, x, is 2.5. However, in spite of the result of the mentioned calculation, the value of x is greater than 0 and less than 4.

Referring to Equation 1, for purposes of theoretical chemical calculations, it will be understood by persons skilled in the art that the combined total weight of reaction products BA, $Na_b Z$ and $B(H_2O)$ is equal to the total combined weight of reactants $R_m$ and R1.

It is taught in the illustrative examples to add water (in addition to water of hydration) to facilitate the reaction between reactants $R_m$ and R1, and also to add water to the reaction products to dilute the reaction products. For calculation purposes, it is to be understood that the weight of all added water is considered to be a part of the total weight of the reaction products. In this regard, this disclosure, at times, refers to the breaker activator (BA), which is limited to the metal chelate defined in Formula 1, while at other times this disclosure refers to the breaker activator solution. The breaker activator solution includes the weight of all of the reaction products shown in Equation 1 plus all added water. Accordingly, any reference to a breaker activator having a particular weight percent means the weight percent of breaker activator (Formula 1) included in the total weight of breaker activator solution.

Breaker activators are sometimes referred to by the letters "BA" in combination with a numeral (e.g., BA 3), or by the letters "BA" in combination with a number and a letter (BA 3e). In the illustrative examples, $Na_4EDTA$ is referred to as reactant R1; $CuSO_4 \cdot 5H_2O$ is referred to as reactant R2; $FeCl_3$ is referred to as reactant R3; $FeSO_4 \cdot 7H_2O$ is referred to as reactant $R_4$; $MnCl_2 \cdot 4H_2O$ is referred to as reactant $R_5$; and $CoCl_2 \cdot 6H_2O$ is referred to as reactant R6. Accordingly, the term $R_m$ in Equation 1 is a general reference to metal-containing salts, such as reactants R2, R3, R4, R5 and R6.

With regard to Equation 1, when the metal-containing salts used to react with the EDTA salt are the specific salts mentioned above, then "M" is a metal selected from copper, iron, manganese and cobalt. Furthermore, Na is sodium and EDTA is an abbreviation for the anion portion of ethylenediaminetetraacetic acid. The valence of "M" is +2 or +3; the valence of EDTA is −4; and the valence of Na is +1.

As mentioned, the breaker activators, as metal chelates, can be employed in dilute aqueous solutions which solutions, not only include the reaction product $M_y Na_x EDTA$, but also include the sodium salt of the anion of the metal-containing salt, any water of hydration included in the metal-containing salt as well as any other added water. In this connection, a desired weight of a particular breaker activator can be made by reacting appropriate weights of reactants, and then diluting the resulting reaction mass with a sufficient quantity of water to obtain a desired concentration of BA in the resulting BA solution. The concentration of breaker activator preferred for use herein to reduce the viscosity of a viscous fluid is an amount in the range of from about 1 to about 20, preferably from about 1.15 to about 5.0, pounds breaker activator per 100 pounds of breaker activator solution. The mentioned appropriate weight of a reactant can be determined by first specifying the desired weight of a specific breaker activator, and thereafter, by use of Equation 1, calculating the weight of reactants required to produce the specified weight. (Note Example A and relevant footnotes.)

Breaker activators can also be employed in the form of a solid adsorbed on a suitable substrate. In this mode of use a concentrated aqueous solution of a breaker activator can be applied to a substrate, such as finally divided walnut hulls. The liquid content of the solution is allowed, or caused, to evaporate to thereby deposit on the substrate a solid which contains the breaker activator. The substrate having the solid breaker activator deposited thereon can be placed in contact with the viscous fluid whose viscosity is to be reduced. It is believed that the deposited breaker activator can operate to delay the release of breaker to the viscous fluid to thereby to extend the time required to produce the viscosity reduction, but that the extent of reduction is not affected.

The breaker can be enclosed in a capsule and the capsule containing the breaker can be placed in contact with the viscous fluid whose viscosity is to be reduced. It is believed that the encapsulated breaker can operate to delay the release of the breaker to the viscous fluid to thereby extend the time required to produce the viscosity reduction, but that the extent of reduction is not affected. An example of an encapsulated breaker is lithium peroxide enclosed within a membrane, which is water permeable and water insoluble. A method of encapsulating the breaker in a capsule is disclosed in U.S. Pat. No. 7,179,485 to Laramay et al the disclosure of which is incorporated herein by reference.

In a preferred practice, the breaker is added to the viscous fluid as a solid, and the breaker activator is usually added to the viscous fluid in the form of an aqueous solution. Accordingly, to avoid mixing the breaker and the breaker activator in aqueous media outside of the presence of the viscous fluid, the components of the second composition are separately added to the viscous fluid. Either the solid breaker or the breaker activator solution can be added to the viscous fluid first and then followed by the other in sequence. However, in one aspect, it is believed that the breaker, when enclosed in capsule, can be dry mixed directly with the breaker activator as a solid deposited on a substrate and the dry mixture then mixed with the viscous fluid to thereby initiate dissolution of each of the breaker and breaker activator and thus the initiation of viscosity reduction reaction. It is believed that a mixture of the dry encapsulated breaker and the dry breaker activator deposited on the substrate can be stored under water-free conditions pending mixing with the viscous fluid.

The term "solvatable, organic polymeric material," as used herein, means and includes a wide variety of natural, modified natural and synthetic hydrophilic polymers which either dissolve in water or, which at least form colloidal dispersions in the presence of water wherein the effect of such solvation is to produce an increase in the viscosity of the water.

The polymeric materials include polysaccharides, such as galactomannan and glucomannan gums, which are naturally occurring; cellulose derivatives which are cellulose modified by reaction with hydrophilic constituents; galactomannan and glucomannan gums, which have been modified by reaction with hydrophilic constituents; and synthetic hydrophilic polymers.

Guar gum, locust bean gum, karaya gum, carboxymethylguar, hydroxyethylguar, hydroxypropylguar, carboxymethylhydroxyethylguar, carboxymethylhydroxypropylguar, carboxymethylcellulose, carboxymethylhydroxyethylcelluose, hydroxyethylcellulose, starches, alginates and carrageenans are examples of natural and modified polymeric materials useful herein.

Examples of synthetic hydrophilic polymers useful include polyethylene oxide, polypropylene oxide, polyacrylate, polymethacrylate, polyacrylamide, polymethacrylamide, maleic anhydride/methylvinyl ether copolymers, polyvinyl alcohol, polyvinylpyrrolidone, polyvinylacetate, copolymers of acrylamide and 2-acrylamido-2-methylpropane sulfonic acid and copolymers of N,N-dimethylacrylamide and 2-acrylamido-2-methylpropane sulfonic acid.

EXAMPLES

Introduction

The text of each numbered example discloses the ingredients, the amount of each ingredient and the procedure employed to combine the ingredients to prepare aqueous viscous fluids. The viscous fluids were employed in tests to determine the reduction in viscosity of the fluids with time. The results of each test are reported as the percent of initial viscosity retained by the tested viscous fluid. The results of each test is also referred to as a break schedule. The break schedules for the examples are presented in the Tables.

Quantities of ingredients employed to produce aqueous viscous fluids used in the performance of industrial formation fracturing services are sometimes reported in terms of the amount of ingredient per 1000 gallons of an aqueous salt solution, such as the amount of ingredient per 1000 gallons of a potassium chloride solution. Mathematical procedures for converting experimental quantities to industrial level quantities are well known.

Chemical breaker activators, or more simply, breaker activators, are specified chemical compounds employed in some examples. The compounds employed, which are metal chelates having the formula $M_y Na_x EDTA$, are referred to the Tables. The content of each employed breaker activator is disclosed in Example A, Breaker Activator Schedule—Recipe. In addition, specific observations regarding each employed breaker activator are provided in Example A, Breaker Activator Schedule—Observations.

Examples 1-4

Separate quantities of gel were prepared by mixing guar gum, water, potassium chloride, acetic acid, a breaker and a pH adjusting material. The initial viscosity of each gel was measured. The viscosity of each gel was also measured at the end of a designated period of time. All viscosity measurements were made with a Brookfield RVDV-1 viscometer equipped with a #3 spindle rotating at 100 rpm.

General Method of Gel Preparation

Each gel (unless otherwise stated) was prepared as follows. Water was added to a suitably sized Waring blender. The blender was activated and the mixing rate was adjusted to form a vortex in the water. Potassium chloride was then added to the operating blender and allowed to dissolve in the water. Thereafter, Guar 8000, a guar gum available from Economy Polymers, was added to the vortex in the operating blender and allowed to disperse in the aqueous solution. After the guar was fully dispersed, acetic acid was added to the mixture in the blender and mixing was continued for 20 minutes to permit the guar to hydrate to thereby form the gel and to develop initial viscosity which was then measured.

Finally, a breaker was added to the formed gel and allowed to become fully dispersed therein. At that point the pH of the gel was measured and a sufficient quantity of pH adjusting material was added to increase or decrease the pH of the gel to a value of about 9. Acetic acid was employed to decrease the pH. Sodium carbonate was employed to increase the pH.

Example 1

A total of four gels were made. The ingredients used to prepare each of the four gels were: water, 1 liter; potassium chloride, 20 grams; guar, 7.2 grams; acetic acid, 0.25 ml; sodium carbonate, 0 grams; and a breaker, 0.120 grams. The density of the solution of potassium chloride in water was determined to be 8.436 pounds per gallon.

A different breaker was employed in each of the four gels as follows: Gel 1, lithium peroxide (LP); Gel 2, ammonium persulfate (AP); Gel 3, calcium peroxide (CP); and Gel 4, sodium persulfate (SPC). By conventional calculation, it was determined that each of the four gels in Example 1 contained about 59.55 pounds guar per 1000 gallons KCl solution, which included about 165.41 pounds of KCl per 1000 gallons KCl solution. Each gel contained about 0.99 pounds of breaker per 1000 gallons KCl solution. The weight ratio of guar to breaker was, thus, about 60.00 pounds guar per pound breaker.

A breaker activator was not employed in any gel in Example 1.

Viscosity Reduction Measurements

Two hundred (200) grams of each prepared gel from Example 1 were placed in each one of four separate 8 ounce jars. The jars containing the gels were allowed to stand at room temperature. The viscosity of each gel was allowed to decline and the viscosity of each gel was measured at the end of each indicated interval of time.

Table 1 reports the break schedule in terms of the percent of initial viscosity retained by each gel tested at the end of each period of time.

TABLE 1

RETAINED VISCOSITY OF GELS CONTAINING DIFFERENT BREAKERS ROOM TEMPERATURE

| Break | Retained Viscosity (As percent of Initial Gel Viscosity) | | | |
|---|---|---|---|---|
| Time Minutes | Gel 1 (LP) | Gel 2 (AP) | Gel 3 (CP) | Gel 4 (SPC) |
| 30 | 100.0 | 100.0 | 92.2 | 81.6 |
| 60 | 99.3 | 99.2 | 90.6 | 72.0 |
| 90 | 98.5 | 98.9 | 88.5 | 62.5 |
| 120 | 97.9 | 98.5 | 86.3 | 53.8 |
| 180 | 97.7 | 98.1 | 81.3 | 39.3 |
| 240 | 97.0 | 97.6 | 76.0 | 30.8 |
| 300 | 96.4 | 96.9 | 70.4 | 25.1 |
| 360 | 96.0 | 96.6 | 66.2 | 21.4 |
| 420 | 96.5 | 96.0 | 61.4 | 18.4 |
| Overnight | 93.9 | 84.5 | 25.2 | 9.2 |

Table 1 reports percent viscosity retention, at room temperature, for guar gels. The data in Table 1 indicates that the rates of decline of retained viscosity of gel 1, containing lithium peroxide breaker, and gel 2, containing ammonium persulfate breaker, were substantially the same over a period of about seven hours. After about seven hours the rate of decline of retained viscosity of gel 1 was less than the rate shown for gel 2. The rates of decline of retained viscosity for guar gels containing calcium peroxide (gel 3) and sodium percarbonate (gel 4) were greater than the rates for gels 1 and 2. The rate of decline of retained viscosity for gel 1 containing lithium peroxide, an alkali metal peroxide, was substantially lower than the rate of decline for gel 3 containing calcium peroxide, an alkaline earth metal peroxide.

Example A

A breaker activator was not employed in Example 1. However, a breaker activator was employed in subsequent examples. What follows is a general description of the preparation of breaker activators used in the examples. Refer to the Breaker Activator Schedule-Recipe for specific ingredients and amounts.

A weighed quantity of the tetrasodium salt of ethylenediaminetetraacetic acid ($Na_4EDTA$), referred to herein as the EDTA salt (reactant R1), was added to each of an appropriate number of separate vessels containing a quantity of deionized water. After the EDTA salt was dissolved, a weighed quantity of a metal-containing salt, $R_m$, was added to the vessel with stirring until a solution was formed. Metal-containing salt, $R_m$, is a general designation for specific reactants R2 through R6.

Reactants R1 and R2 reacted to form breaker activator BA 1. Reactants R1 and R3 reacted to form breaker activators BA 2 and BA 6. Reactants R1 and R4 reacted to form breaker activators BA 3, BA 3a, BA 3b, BA 3c, BA 3d, BA 3e, BA 3f, BA 3g, BA 7 and BA 8. Reactants R1 and R5 reacted to form breaker activator BA 4. Reactants R1 and R6 reacted to form breaker activator BA 5.

Specific quantities of reactants were employed in each reaction to produce a defined quantity of breaker activator. Accordingly, sufficient quantities of specific reactants were employed to make 2.5 grams of breaker activators BA 1, BA 2, BA 3, BA 4 and BA 5. Sufficient quantities of specific reactants were employed to make 5.0 grams of breaker activators BA 3a, BA 3b, BA 3c, BA 3d, BA 3e, BA 3f and BA 3g. Sufficient quantities of specific reactants were employed to make 14.98 grams of breaker activator BA 6. Sufficient quantities of specific reactants were employed to make 36.32 grams of breaker activator BA 7. Sufficient quantities of specific reactants were employed to make 2.3 grams of breaker activator BA 8. The specific quantity and amount of each reactant is disclosed in the Breaker Activator Schedule-Recipe. Such specific amounts can be calculated by employing the previously disclosed Equation 1.

Each reaction product containing a desired breaker activator was diluted with water in an amount sufficient to produce a breaker activator solution containing a designated concentration of breaker activator. Accordingly, reaction products containing breaker activators BA 1, BA 2, BA 3, BA 4 and BA 5 were diluted with sufficient water to produce breaker activator solutions containing 5 weight percent breaker activator. Reaction products containing breaker activators BA 3a to BA 3g were diluted with sufficient water to produce breaker activator solutions containing 2 weight percent breaker activator. The reaction product containing breaker activator BA 6 was diluted with sufficient water to produce a breaker activator solution containing 17.5 weight percent BA 6. The reaction product containing breaker activator BA 7 was diluted with sufficient water to produce a breaker activator solution containing 18.3 weight percent BA 7. The reaction product containing breaker activator BA 8 was diluted with sufficient water to produce a breaker activator solution containing 1.15 weight percent breaker activator BA 8. The specific quantity and amount of added water is disclosed in the Breaker Activator Schedule-Recipe.

The Breaker Activator Schedule-Observations includes data pertaining to the prepared breaker activator solutions.

Breaker activator solutions containing breaker activators BA 3a, BA 3b, BA 3c and BA 3d, after dilution, were red in color. The breaker activator solution containing breaker activator BA 3e was hazy red in color which was indicative of a suspension. The breaker activator solutions containing breaker activators BA 3f and BA 3g contained precipitated solids. These products were, therefor, not employed in viscosity reduction measurements.

Breaker Activator Schedule-Recipe

| BA No | R1 grams | R2 grams | R3 grams | R4 grams | R5 grams | R6 grams | Total Added Water grams | Notes 0 |
|---|---|---|---|---|---|---|---|---|
| 1 | 2.5 | 2.416 | 1.190 | | | | | 46.394 | 1 |
| 2 | 2.5 | 2.566 | | 0.821 | | | | 46.613 | 1 |
| 3 | 2.5 | 2.452 | | | 1.345 | | | 46.203 | 1 |
| 4 | 2.5 | 2.456 | | | | 0.959 | | 46.585 | 1 |
| 5 | 2.5 | 2.438 | | | | | 1.144 | 46.418 | 1 |
| 3a | 5.0 | 4.968 | | | 0.908 | | | 244.364 | 2 |
| 3b | 5.0 | 4.936 | | | 1.805 | | | 243.249 | 2 |
| 3c | 5.0 | 4.904 | | | 2.689 | | | 242.437 | 2 |
| 3d | 5.0 | 4.874 | | | 3.222 | | | 241.914 | 2 |
| 3e | 5.0 | 4.873 | | | 3.563 | | | 241.574 | 2 |
| 3f | 5.0 | 4.812 | | | 5.279 | | | 239.939 | 2 |
| 3g | 5.0 | 4.753 | | | 6.952 | | | 238.315 | 2 |
| 6 | 14.98 | 15.35 | | 4.900 | | | | 65.35 | 4 |
| 7 | 36.32 | 35.56 | | | 19.54 | | | 143.39 | 5 |
| 8 | 2.298 | 2.254 | | | 1.240 | | | 196.500 | 3 |

| BA No | BA grams | R1 grams | R2 grams | R3 grams | R4 grams | R5 grams | R6 grams | Total Added Water grams | Notes 0 |
|---|---|---|---|---|---|---|---|---|---|
| 1 | 2.5 | 2.416 | 1.190 | | | | | 46.394 | 1 |
| 2 | 2.5 | 2.566 | | 0.821 | | | | 46.613 | 1 |
| 3 | 2.5 | 2.452 | | | 1.345 | | | 46.203 | 1 |
| 4 | 2.5 | 2.456 | | | | 0.959 | | 46.585 | 1 |
| 5 | 2.5 | 2.438 | | | | | 1.144 | 46.418 | 1 |
| 3a | 5.0 | 4.968 | | | 0.908 | | | 244.364 | 2 |
| 3b | 5.0 | 4.936 | | | 1.805 | | | 243.249 | 2 |
| 3c | 5.0 | 4.904 | | | 2.689 | | | 242.437 | 2 |
| 3d | 5.0 | 4.874 | | | 3.222 | | | 241.914 | 2 |
| 3e | 5.0 | 4.873 | | | 3.563 | | | 241.574 | 2 |
| 3f | 5.0 | 4.812 | | | 5.279 | | | 239.939 | 2 |
| 3g | 5.0 | 4.753 | | | 6.952 | | | 238.315 | 2 |
| 6 | 14.98 | 15.35 | | 4.900 | | | | 65.35 | 4 |
| 7 | 36.32 | 35.56 | | | 19.54 | | | 143.39 | 5 |
| 8 | 2.298 | 2.254 | | | 1.240 | | | 196.500 | 3 |

Notes:
0. BA is $M_yNa_xEDTA$. R1 is $Na_4EDTA$. R2 is $CuSO_4 \cdot 5H_2O$. R3 is $FeCl_3$. R4 is $FeSO_4 \cdot 7H_2O$. R5 is $MnCl_2 \cdot 4H_2O$. R6 is $CoCl_2 \cdot 6H_2O$.
1. Water, in an amount sufficient to produce a total weight of about 50 grams, was added to the reaction mass.
2. Water, in an amount sufficient to produce a total weight of about 250 grams, was added to the reaction mass.
3. Water, in an amount sufficient to produce a total weight of about 200 grams was added to the reaction mass.
4. Water, in an amount sufficient to produce a total weight of about 85.6 grams was added to the reaction mass.
5. Water, in an amount sufficient to produce a total weight of about 198.45 grams was added to the reaction mass.

Breaker Activator Schedule—Observations

| BA | Mole Weight | M | y | x | Conc. lb per 100 lb sol'n | Density lb sol'n per gal sol'n | Moles R1 × $10^{-3}$ | Moles $R_m$ × $10^{-3}$ | Mole Ratio $R_m$ to R1 | Notes 0, 7 |
|---|---|---|---|---|---|---|---|---|---|---|
| 1 | 393.349 | $Cu^{+2}$ | 0.75 | 2.50 | 5.00 | 8.6470 | 6.356 | 4.767 | 0.75 | 1 |
| 2 | 370.332 | $Fe^{+3}$ | 0.75 | 1.75 | 5.00 | 8.6210 | 6.751 | 5.063 | 0.75 | 1 |
| 3 | 387.574 | $Fe^{+2}$ | 0.75 | 2.50 | 5.00 | 8.6830 | 6.450 | 4.838 | 0.75 | 1 |
| 4 | 386.893 | $Mn^{+2}$ | 0.75 | 2.50 | 5.00 | 8.6180 | 6.462 | 4.846 | 0.75 | 1 |
| 5 | 389.889 | $Co^{+2}$ | 0.75 | 2.50 | 5.00 | 8.6160 | 6.412 | 4.809 | 0.75 | 1 |
| 3a | 382.641 | $Fe^{+2}$ | 0.25 | 3.50 | 2.00 | 8.4060 | 13.070 | 3.270 | 0.25 | 1 |
| 3b | 385.108 | $Fe^{+2}$ | 0.50 | 3.00 | 2.00 | 8.4370 | 12.980 | 6.490 | 0.50 | 1 |
| 3c | 387.574 | $Fe^{+2}$ | 0.75 | 2.50 | 2.00 | 8.4960 | 12.900 | 9.680 | 0.75 | 1 |
| 3d | 389.054 | $Fe^{+2}$ | 0.90 | 2.20 | 2.00 | 8.4660 | 12.820 | 11.540 | 0.90 | 1 |
| 3e | 390.041 | $Fe^{+2}$ | 1.00 | 2.00 | 2.00 | 8.4097 | 12.820 | 12.820 | 1.00 | 1, 2 |
| 3f | 394.975 | $Fe^{+2}$ | 1.50 | 1.00 | 2.00 | **** | 12.660 | 18.990 | 1.50 | 1, 3 |
| 3g | 399.909 | $Fe^{+2}$ | 2.00 | 0.00 | 2.00 | **** | 12.500 | 25.010 | 2.00 | 1, 3 |
| 6 | 370.332 | $Fe^{+3}$ | 0.75 | 1.75 | 17.50 | **** | 40.450 | 30.200 | 0.75 | 1, 4 |
| 7 | 387.574 | $Fe^{+2}$ | 0.75 | 2.50 | 18.30 | **** | 93.712 | 70.300 | 0.75 | 1, 5 |
| 8 | 387.574 | $Fe^{+2}$ | 0.75 | 2.50 | 1.15 | 8.3850 | 5.930 | 4.460 | 0.75 | 1, 6 |

Notes:
0. $R_m$ is a general reference one of reactants R2, R3, R4, R5 and R6. The specific reference is to the reactant containing the metal "M" specified in column 3 of the table. R1 is a specific reference to $Na_4EDTA$. BA is general reference to breaker activator $M_yNa_xEDTA$.
1. The stoichiometric quantity, y, of the metal "M" in a particular breaker activator is also the ratio of the number of moles of the metal-containing salt, $R_m$, to the number of moles of R1. Also, the number of moles of BA is equal to the number of moles of R1.
2. The reaction product was rather hazy, which indicated the presence of a suspended precipitate. The indicated density is, thus, the density of the suspension.
3. The reaction product contained precipitated solids. Accordingly, a solution density could not be measured.
4. BA 6 was a more concentrated version of BA 2. BA 6 formed an initial solution, but a precipitate may form upon standing.
5. BA 7 was a more concentrated version of BA 3. BA 7 formed an initial solution, but a precipitate may form upon standing.
6. BA 8 is a more dilute version of BA 3.
7. Equation 1, which describes the reaction between reactant $R_m$ and reactant R1, is provided below: $y * G[(M^nZ^b) \cdot B(H_2O)] + G[Na_4(EDTA)] \rightarrow G[M_yNa_{(4-ny)}(EDTA)] + y * G[Na_bZ] + y * G[B(H_2O)]$
wherein:
$R_m$ is $[(M^nZ^b) \cdot B(H_2O)]$ -continued Breaker Activator Schedule—Observations

| BA | Mole Weight | M | y | x | Conc. lb per 100 lb sol'n | Density lb sol'n per gal sol'n | Moles R1 × $10^{-3}$ | Moles $R_m$ × $10^{-3}$ | Mole Ratio $R_m$ to R1 | Notes 0, 7 |
|----|---|---|---|---|---|---|---|---|---|---|

R1 is [Na$_4$(EDTA)]
BA is [M$_y$Na$_{(4-ny)}$(EDTA)]
[Na$_b$Z] is a salt consisting of sodium and the anion "Z" in R$_m$.
B(H$_2$O) is the water of hydration in R$_m$.
y is the stoichiometric amount of the metal "M" in BA, and is also the ratio of the moles of R$_m$ to the moles of R1. (See note 1.)
b is the valence of the anion "Z" in R$_m$.
n is the valence of the metal "M" in R$_m$ and BA.
B is the number of moles of the water of hydration in R$_m$.
G is the number of moles of R1 and is also the number of moles of BA.

Example 2

This example compared the percent of initial viscosity of six base guar gels. One gel contained lithium peroxide breaker, but no breaker activator. Five of the gels contained lithium peroxide breaker in combination with a different breaker activator.

The ingredients used to prepare each of the six gels were: water, 2 liters; potassium chloride, 40 grams; guar, 14.4 grams; acetic acid, 1.2 ml; sodium carbonate, 0.1 grams; and lithium peroxide breaker, 0.48 grams. The density of the solution of potassium chloride in water was determined to be 8.436 pounds per gallon. In addition to the above, portions of five of the gels each contained 0.20 milliliters of a breaker activator solution.

Preparation of Gel

Each gel was prepared as described in the above general procedure. The only difference between the general procedure and the procedure in this example was that 0.50 milliliters of acetic acid was added to the dispersion prior to the addition of breaker. After the addition of breaker, the pH of the gel was measured and 0.70 milliliters of acetic acid and 0.10 grams of sodium carbonate were added to decrease the pH of the gel to a value of 9.08.

Viscosity Reduction Measurements

Two hundred grams of the base gel containing the lithium peroxide breaker were placed in each one of six separate 8 ounce jars. A different breaker activator solution in an amount of 0.20 milliliters was added to each of five of the jars. The breaker activator solutions employed contained BA 1, BA 2, BA 3, BA 4 and BA 5 which are identified in the Breaker Activator Schedule.

By conventional calculation, it was determined that each of the six gels contained about 59.55 pounds guar per 1000 gallons KCl solution, which included about 165.41 pounds of KCl per 1000 gallons KCl solution. Each gel contained about 1.98 pounds of breaker per 1000 gallons KCl solution. The weight ratio of guar to breaker was, thus, about 30.00 pounds guar per pound breaker. The weight and mole ratios disclosed in Table 2 were also determined by conventional calculation.

It was calculated that breaker activator was present in five gels in an amount of about 0.44 pounds of breaker activator per 1000 gallons KCl solution. The weight ratio of breaker activator to lithium peroxide breaker was substantially constant at about 0.22 weight parts breaker activator per 1 weight part lithium peroxide breaker; the weight ratio of metal, M, in each breaker activator to lithium peroxide ranged from about $23.56 \times 10^{-3}$ to about $26.89 \times 10^{-3}$ weight parts M per weight part lithium peroxide; and the mole ratio of metal, M, in each breaker activator to lithium peroxide ranged from about 19.42 to about $20.56 \times 10^{-3}$ moles M per mole lithium peroxide.

All jars were sealed, shaken and were allowed to stand in a 100° F. constant temperature water bath. The viscosity of each gel in each jar was measured.

Table 2 reports viscosity reduction in terms of the percent of initial viscosity retained by each gel tested at the end of each period of time. The reported results were obtained for guar gels maintained at a temperature of 100° F.

TABLE 2

RETAINED VISCOSITY AT 100° F. OF GELS CONTAINING LITHIUM PEROXIDE AND A BREAKER ACTIVATOR

| Breaker Activator | BREAK TIME OF GEL MINUTES | | | | | | | | | |
|---|---|---|---|---|---|---|---|---|---|---|
| wt ratio: $10^{-3}$ M to Breaker mole ratio: $10^{-3}$ M to Breaker | 30 | 60 | 90 | 120 | 180 | 240 | 300 | 360 | 420 | Over Night |
| | RETAINED VISCOSITY AS PERCENT OF INITIAL VISCOSITY OF GEL | | | | | | | | | |
| No breaker activator wt ratio: 0 mol ratio: 0 | 100 | 99 | 97 | 96 | 95 | 94 | 92 | 91 | 90 | 88 |
| BA 1 (copper) wt ratio: 26.89 mol ratio: 19.42 | 100 | 96 | 92 | 89 | 86 | 83 | 78 | 75 | 72 | 69 |
| BA 2 (iron III) wt ratio: 25.03 mol ratio: 20.56 | 48 | 15 | 7 | 4 | 3 | 3 | — | — | — | — |

TABLE 2-continued

RETAINED VISCOSITY AT 100° F. OF GELS CONTAINING LITHIUM PEROXIDE AND A BREAKER ACTIVATOR

| Breaker Activator | BREAK TIME OF GEL MINUTES | | | | | | | | | |
|---|---|---|---|---|---|---|---|---|---|---|
| wt ratio: $10^{-3}$ M to Breaker mole ratio: $10^{-3}$ M to Breaker | 30 | 60 | 90 | 120 | 180 | 240 | 300 | 360 | 420 | Over Night |
| | RETAINED VISCOSITY AS PERCENT OF INITIAL VISCOSITY OF GEL | | | | | | | | | |
| BA 3 (iron II) wt ratio: 24.08 mol ratio: 19.79 | 13 | 4 | 3 | 2 | — | — | — | — | — | — |
| BA 4 (manganese) wt ratio: 23.56 mol ratio: 19.67 | 100 | 97 | 96 | 95 | 94 | 93 | 90 | 88 | 84 | 80 |
| BA 5 (cobalt) wt ratio: 25.07 mol ratio: 19.52 | 92 | 89 | 86 | 84 | 82 | 79 | 73 | 66 | 60 | 53 |

The results shown in Table 2 reveal that a variety of metal chelates function to change the rate at which lithium peroxide operates to reduce the viscosity of a gel. The ratios of breaker activator solution volume to gel weight for the gels were identical, and the mole ratios of metal to breaker were substantially identical at about $19.79 \times 10^{-3}$ moles M per mole breaker, but gels treated with breaker systems containing lithium peroxide breaker in combination with breaker activators BA 2 and BA 3, made with iron, acted to reduce the viscosity of the gel at rates which were substantially greater than the rates of the other breaker systems.

The weight and mole ratios of iron to breaker, using iron having a valence of +3 (BA 2), were slightly greater than the weight and mole ratios of iron to breaker, using iron having a valence of +2 (BA 3), but the rate of viscosity reduction produced by the breaker system containing BA 3, especially in the first hour, was substantially greater than the viscosity reduction produced by the breaker system containing BA 2.

Compare the results obtained for Gel 1 in Table 1 with the results obtained for the gel containing no breaker activator in Table 2. The base gels employed in Examples 1 and 2 were identical, but the concentration of lithium peroxide breaker in the gel prepared in Example 2 was two times greater than the concentration of lithium peroxide breaker in Gel 1 of Example 1. Room temperature was employed in Example 1, while the temperature employed in Example 2 was 100° F. The greater rate of viscosity reduction indicated by the results in Table 2, which is particularly evident after about 4 hours, can be explained by the decrease in the ratio of guar to breaker in Example 2 as compared to Example 1, and by the increase in test temperature in Example 2 as compared to Example 1.

Example 3A

This example compares the retained viscosity of six base guar gels. One gel contained lithium peroxide breaker, but no breaker activator. Five of the gels contained lithium peroxide breaker in combination with a breaker activator.

The ingredients used to prepare each of the six gels were: water, 3 liters; potassium chloride, 60 grams; guar, 21.6 grams; acetic acid, 1.8 ml; sodium carbonate, 0.15 grams; and lithium peroxide breaker, 0.72 grams. The density of the solution of potassium chloride in water was determined to be 8.436 pounds per gallon. In addition to the above, portions of five of the gels each contained 0.10 milliliters, of a breaker activator solution.

Preparation of Gel

A gel was prepared as described in the above general procedure. The only difference between the general procedure and the procedure in this example was that 0.75 milliliters of acetic acid was added to the dispersion prior to the addition of breaker. After the addition of breaker, the pH of the gel was measured and 1.05 milliliters of acetic acid and 0.15 grams of sodium carbonate were added to decrease the pH of the gel to a value of 9.08.

Viscosity Reduction Measurements

Two hundred grams of the prepared base gel containing the breaker were placed in each one of six separate 8 ounce jars. A different breaker activator solution, in the amount of 0.10 milliliters, was added to each one of five jars. The breaker activators employed were BA 3a, BA 3b, BA 3c, BA 3d and BA 3e which are identified in the Breaker Activator Schedule. Each of the breaker activators was a different formulation of breaker activator 3 (BA 3) as described in Example 2. Breaker activators BA 3f and BA 3g (Breaker Activator Schedule) contained precipitate, were not added to a jar and were not employed in viscosity reduction measurements. Accordingly, five jars contained gel, lithium peroxide and a breaker activator, and one jar contained gel and lithium peroxide, but no breaker activator.

By conventional calculation, it was determined that each of the six gels in Example 3 contained about 59.55 pounds guar per 1000 gallons KCl solution, which included about 165.41 pounds of KCl per 1000 gallons KCl solution. Each gel contained about 1.98 pounds of breaker per 1000 gallons KCl solution. The weight ratio of guar to breaker was, thus, about 30 pounds guar per pound breaker. The weight and mole ratios disclosed in Table 3A were also determined by conventional calculation. Each gel in Example 3A contained the same volume of breaker activator solution which, by calculation, represents about 0.086 pounds of breaker activator per 1000 gallons KCl. The weight ratio of breaker activator to lithium peroxide breaker was substantially constant at about 0.043 weight parts breaker activator per 1 weight part lithium peroxide breaker, but the weight ratio of iron(II) (Fe+2) in each breaker activator to lithium peroxide varied from about $1.57 \times 10^{-3}$ to about $6.18 \times 10^{-3}$ iron(II) per 1 weight part lithium peroxide breaker.

All jars were sealed, shaken and were allowed to stand in a 100° F. constant temperature water bath. The viscosity of each gel in each jar was measured. The viscosity of each gel in each jar was measured at the end of each period of time as shown in Table 3A which reports viscosity reduction in terms of the percent of initial viscosity retained by each gel.

TABLE 3A

RETAINED VISCOSITY AT 100° F. OF GELS
CONTAINING LITHIUM PEROXIDE AND A BREAKER ACTIVATOR
BASIS: 0.5095 gal BA sol'n/1000 gal KCl sol'n

| Breaker Activator | BREAK TIME OF GEL MINUTES | | | | | | | | | |
|---|---|---|---|---|---|---|---|---|---|---|
| wt ratio: $10^{-3}$ Fe to Breaker<br>mole ratio: $10^{-3}$ Fe to Breaker | 30 | 60 | 90 | 120 | 150 | 180 | 240 | 300 | 420 | Over Night |
| | RETAINED VISCOSITY AS PERCENT OF INITIAL VISCOSITY OF GEL | | | | | | | | | |
| No breaker activator<br>wt ratio: 0<br>mole ratio: 0 | 100 | 95 | 93 | 93 | 91 | 89 | 89 | 88 | | 77 |
| BA 3a<br>wt ratio: 1.574<br>mol ratio: 1.293 | 90 | 78 | 68 | 60 | 50 | 47 | 34 | 23 | | 3 |
| BA 3b<br>wt ratio: 3.140<br>mol ratio: 2.58 | 83 | 66 | 51 | 40 | 27 | 23 | 15 | 9 | | 2 |
| BA 3c<br>wt ratio: 4.713<br>mol ratio: 3.872 | 76 | 53 | 34 | 23 | 14 | 12 | 8 | 5 | | 2 |
| BA 3d<br>wt ratio: 5.614<br>mol ratio: 4.612 | 71 | 46 | 28 | 18 | 11 | 9 | 7 | 4 | | 2 |
| BA 3e<br>wt ratio: 6.181<br>mol ratio: 5.078 | 67 | 40 | 23 | 16 | 10 | 8 | 6 | 4 | | 2 |

Table 3A clearly shows that the rate of viscosity decrease, at constant temperature, is a function of the increase in weight ratio and mole ratio, of Fe(II) to lithium peroxide breaker.

Example 3B

Example 3A was repeated except the volume of breaker activator solution employed in Example 3B, in contrast with Example 3A, was not constant. In this regard, the volumes of breaker activator solution employed in Example 3B were: BA 3a solution, 0.395 ml; BA 3b solution, 0.2 ml; BA 3c solution, 0.135 ml; BA 3d solution, 0.11 ml; and BA 3e solution, 0.1 ml.

It was calculated that the gels in Example 3B contained in the range of from about 0.086 to about 0.338 pounds of breaker activator per 1000 gallons KCl solution. It was also calculated that the weight ratio of breaker activator to lithium peroxide breaker ranged from about 0.043 to about 0.17 weight parts breaker activator per 1 weight part lithium peroxide breaker. The weight ratio of iron(II) in each breaker activator to lithium peroxide was substantially constant. The ratio ranged from about 6.176 to about $6.363 \times 10^{-3}$ weight parts iron(II) per 1 weight part lithium peroxide.

The results of the viscosity reduction measurements are provided in Table 3B.

TABLE 3B

RETAINED VISCOSITY AT 100° F. OF GELS
CONTAINING LITHIUM PEROXIDE AND A BREAKER ACTIVATOR
BASIS: 2.0123 gal BA 3a sol'n/1000 gal KCl sol'n
BASIS: 1.0189 gal BA 3b sol'n/1000 gal KCl sol'n
BASIS: 0.6878 gal BA 3c sol'n/1000 gal KCl sol'n
BASIS: 0.5604 gal BA 3d sol'n/1000 gal KCl sol'n
BASIS: 0.5095 gal BA 3e sol'n/1000 gal KCl sol'n

| Breaker Activator | BREAK TIME OF GEL MINUTES | | | | | | | | | |
|---|---|---|---|---|---|---|---|---|---|---|
| wt ratio: $10^{-3}$ Fe to breaker<br>Mole ratio: $10^{-3}$ Fe to breaker | 30 | 60 | 90 | 120 | 150 | 180 | 240 | 300 | 420 | Over Night |
| | RETAINED VISCOSITY AS PERCENT OF INITIAL VISCOSITY OF GEL | | | | | | | | | |
| No breaker activator<br>wt ratio: 0<br>mole ratio: 0 | 100 | 95 | 93 | 93 | 91 | 89 | 89 | 88 | | 77 |
| BA 3a<br>wt ratio: 6.219<br>mol ratio: 5.109 | 69 | 42 | 23 | 16 | 9 | 7 | 6 | 4 | | 2 |

TABLE 3B-continued

RETAINED VISCOSITY AT 100° F. OF GELS
CONTAINING LITHIUM PEROXIDE AND A BREAKER ACTIVATOR
BASIS: 2.0123 gal BA 3a sol'n/1000 gal KCl sol'n
BASIS: 1.0189 gal BA 3b sol'n/1000 gal KCl sol'n
BASIS: 0.6878 gal BA 3c sol'n/1000 gal KCl sol'n
BASIS: 0.5604 gal BA 3d sol'n/1000 gal KCl sol'n
BASIS: 0.5095 gal BA 3e sol'n/1000 gal KCl sol'n

| Breaker Activator wt ratio: $10^{-3}$ Fe to breaker Mole ratio: $10^{-3}$ Fe to breaker | BREAK TIME OF GEL MINUTES | | | | | | | | | |
|---|---|---|---|---|---|---|---|---|---|---|
| | 30 | 60 | 90 | 120 | 150 | 180 | 240 | 300 | 420 | Over Night |
| | RETAINED VISCOSITY AS PERCENT OF INITIAL VISCOSITY OF GEL | | | | | | | | | |
| BA 3b wt ratio: 6.280 mol ratio: 5.159 | 68 | 38 | 21 | 14 | 9 | 7 | 5 | 3 | | 2 |
| BA 3c wt ratio: 6.363 mol ratio: 5.227 | 67 | 39 | 22 | 15 | 9 | 7 | 5 | 4 | | 2 |
| BA 3d wt ratio: 6.176 mol ratio: 5.074 | 67 | 39 | 21 | 15 | 9 | 7 | 5 | 4 | | 2 |
| BA 3e wt ratio: 6.181 mol ratio: 5.078 | 67 | 40 | 23 | 16 | 10 | 8 | 6 | 4 | | 2 |

Table 3B reports viscosity reduction, at constant temperature, in terms of the percent of initial viscosity retained by each gel containing a breaker activator. The table shows that the viscosity retention of each gel at each time interval was substantially the same. This result can be explained by the fact that the weight ratio of Fe(II) to lithium peroxide breaker in each gel was substantially the same.

The weight ratio of iron (II) to breaker had a substantial effect on viscosity reduction. Thus, the viscosity retention shown in Table 3A for each period of time, especially over the first three hours, showed a decrease corresponding to the increase in weight ratio of iron (II) to breaker, but the viscosity retention shown in Table 3B for each period of time was substantially constant corresponding to the substantially constant weight ratio of iron (II) to breaker.

The difference between each breaker activator solution employed in each of Examples 3A and 3B was the stoichiometric quantity of iron(II) which ranged from 0.25 to 1.0. (See Breaker Activator Schedule—Observations.)

The volume of breaker activator solution employed in Example 3A was constant, but the ratio of iron(II) to breaker increased in response to the stoichiometric quantity of iron. The total viscosity reduction produced over a period of greater than about five hours by each breaker activator was substantially the same, but the reduction for periods of less than about 5 hours was greater for those activators which provided a greater quantity of iron (II) per unit quantity of breaker.

The volume of breaker activator solution employed in Example 3B was not constant, but the ratio of iron (II) to lithium peroxide breaker was substantially constant due to the difference in the stoichiometric quantity of iron and the volumes employed. The rate of viscosity retention of each gel over the same time interval was substantially the same.

Example 4A

This example compared the retained viscosity of six guar gels. One gel contained lithium peroxide breaker, but no breaker activator. Five of the gels contained lithium peroxide breaker in combination with a different quantity of breaker activator 2 (BA 2) solution. BA 2 contains iron (III).

Each gel tested was prepared exactly as described in Example 2. In Example 2, five different breaker activators were employed, one of which was BA 2. In this Example 4A, five different quantities of BA 2 were employed.

Six test gels were taken from the base gel prepared in Example 4A. Each test gel contained 200 grams. No breaker activator solution was added to test gel 1. BA 2 solution in the amount of 0.025 ml was added to test gel 2. BA 2 solution in the amount of 0.050 ml was added to test gel 3. BA 2 solution in the amount of 0.100 ml was added to test gel 4. BA 2 solution in the amount of 0.200 ml was added to test gel 5. BA 2 solution in the amount of 0.400 ml was added to test gel 6.

The viscosity reduction procedure and measurements were performed as described in Example 2.

By conventional calculation, it was determined that each of the six gels in Example 4A contained about 59.55 pounds guar per 1000 gallons KCl solution, which included about 165.41 pounds of KCl per 1000 gallons KCl solution. Each gel contained about 1.98 pounds of breaker per 1000 gallons KCl solution. The weight ratio of guar to breaker was, thus, about 30 pounds guar per pound breaker. The weight and mole ratios disclosed in Table 4A were also determined by conventional calculation. The concentration of BA 2 in gels 2-6 ranged from about 0.055 to about 0.878 pounds of BA 2 per 1000 gallons KCl solution; the weight ratio of BA 2 to lithium peroxide breaker ranged from about 0.028 to about 0.443 weight parts BA 2 per 1 weight part lithium peroxide breaker; and the weight ratio of iron (III) to lithium peroxide breaker ranged from about 3.128 to about $50.051 \times 10^{-3}$ weight parts Fe+3 per 1 weight part lithium peroxide breaker.

Table 4A reports viscosity reduction in terms of the percent of initial viscosity retained by each gel tested at the end of each period of time.

TABLE 4A

RETAINED VISCOSITY AT 100° F. OF GELS CONTAINING LITHIUM PEROXIDE AND VARIOUS CONCENTRATIONS OF BREAKER ACTIVATOR 2

| Gel Number gal BA 2 sol.n per 1000 gal KCl sol'n | BREAK TIME OF GEL MINUTES | | | | | | | | | |
|---|---|---|---|---|---|---|---|---|---|---|
| wt ratio: $10^{-3}$ Fe to breaker Mole ratio: $10^{-3}$ Fe to breaker | 30 | 60 | 90 | 120 | 180 | 240 | 300 | 360 | 420 | Over Night |
| | RETAINED VISCOSITY AS PERCENT OF INITIAL VISCOSITY OF GEL | | | | | | | | | |
| 1 gal/1000: 0 wt ratio: 0 mol ratio: 0 | 100 | 95 | 93 | 89 | 88 | 87 | 83 | 81 | | |
| 2 gal/1000: 0.128 wt ratio: 3.128 mol ratio: 2.57 | 66 | 30 | 17 | 8 | 7 | 5 | 4 | 3 | | |
| 3 gal/1000: 0.255 wt ratio: 6.256 mol ratio: 5.14 | 29 | 11 | 6 | 4 | — | — | — | — | — | — |
| 4 gal/1000: 0.509 wt ratio: 12.513 mol ratio: 10.28 | 14 | 5 | 3 | — | — | — | — | — | — | — |
| 5 gal/1000: 1.019 wt ratio: 25.026 mol ratio: 20.56 | 6 | 2 | — | — | — | — | — | — | — | — |
| 6 gal/1000: 2.038 wt ratio: 50.051 mol ratio: 41.12 | 3 | 2 | — | — | — | — | — | — | — | — |

The results reported in Table 4A make clear that the viscosity retention, at constant temperature, for each period of time is directly related to the ratio of iron (III) to lithium peroxide, wherein the higher the ratio the lower the percent retention.

Example 4B

This example compared the retained viscosity of six guar gels. One gel contained lithium peroxide breaker and five of the gels each employed a breaker system. Each breaker system consisted of lithium peroxide in combination with a different quantity of breaker activator 3 as described in Example 2.

Each gel tested was prepared exactly as described in Example 2. In Example 2, five different breaker activators were employed, one of which was BA 3. In this example five different quantities of BA 3 solution were employed.

Six test gels were taken from the base gel prepared in Example 4B. Each test gel contained 200 grams. No breaker activator was added to test gel 1. BA 3 solution in the amount of 0.025 ml was added to test gel 2. BA 3 solution in the amount of 0.050 ml was added to test gel 3. BA 3 solution in the amount of 0.100 ml was added to test gel 4. BA 3 solution in the amount of 0.200 ml was added to test gel 5. BA 3 solution in the amount of 0.400 ml was added to test gel 6.

The viscosity reduction procedure and measurements were performed as described in Example 2.

By conventional calculation, it was determined that each of the six gels in Example 4B contained about 59.55 pounds guar per 1000 gallons KCl solution, which included about 165.41 pounds of KCl per 1000 gallons KCl solution. Each gel contained about 1.98 pounds of breaker per 1000 gallons KCl solution. The weight ratio of guar to breaker was, thus, about 30 pounds guar per pound breaker. The weight and mole ratios disclosed in Table 4B were also determined by conventional calculation. The concentration of BA 3 in gels 2-6 ranged from about 0.055 to about 0.885 pounds of BA 3 per 1000 gallons KCl; the weight ratio of BA 3 to lithium peroxide breaker ranged from about 0.028 to about 0.446 weight parts BA 3 per 1 weight part lithium peroxide breaker; and the weight ratio of iron (II) to lithium peroxide breaker ranged from about 3.011 to about $48.169 \times 10^{-3}$ weight parts Fe+2 per 1 weight part lithium peroxide breaker.

Table 4B reports viscosity reduction in terms of the percent of initial viscosity retained by each gel tested at the end of each period of time.

TABLE 4B

RETAINED VISCOSITY AT 100° F. OF GELS CONTAINING LITHIUM PEROXIDE AND VARIOUS CONCENTRATIONS OF BREAKER ACTIVATOR 3

| Gel Number gal BA 3 sol'n per gal/1000 KCl sol'n | BREAK TIME OF GEL MINUTES | | | | | | | | | |
|---|---|---|---|---|---|---|---|---|---|---|
| wt ratio: $10^{-3}$ Fe to breaker Mole ratio: $10^{-3}$ Fe to breaker | 30 | 60 | 90 | 120 | 180 | 240 | 300 | 360 | 420 | Over Night |
| | RETAINED VISCOSITY AS PERCENT OF INITIAL VISCOSITY OF GEL | | | | | | | | | |
| 1 gal/1000: 0 wt ratio: 0 mol ratio: 0 | 100 | 95 | 93 | 89 | 88 | 87 | 83 | 81 | | |
| 2 gal/1000: 0.127 wt ratio: 3.011 mol ratio: 2.473 | 89 | 70 | 57 | 26 | 20 | 13 | 9 | 7 | | |
| 3 gal/1000: 0.255 wt ratio: 6.021 mol ratio: 4.947 | 71 | 38 | 18 | 8 | 7 | 5 | 4 | — | — | — |
| 4 gal/1000: 0.509 wt ratio: 12.042 mol ratio: 9.893 | 54 | 16 | 4 | 2 | — | — | — | — | — | — |
| 5 gal/1000: 1.019 wt ratio: 24.084 mol ratio: 19.786 | 21 | 6 | 3 | 2 | — | — | — | — | — | — |
| 6 gal/1000: 2.038 wt ratio: 48.169 mol ratio: 39.572 | 8 | 3 | — | — | — | — | — | — | — | — |

The results shown in Table 4B demonstrate the use of five different volumes of a breaker activator solution containing iron in the +2 valence state in combination with lithium peroxide breaker to reduce the viscosity of a gel. The weight ratio of iron(II) to breaker was different for each gel. The total viscosity retention produced over the entire test period of about 6 hours was substantially the same, but the rate of reduction was substantially greater for those gels containing a greater quantity of iron(II) per unit quantity of breaker.

The ratios of iron to breaker in the gels tested in Table 4A were substantially the same to slightly greater than the ratios in Table 4B. Upon comparing the results in Tables 4A and 4B, it is clear that breaker activator 2 (BA 2), which contained iron in the +3 valence state, produced a higher rate of viscosity reduction than breaker activator 3 (BA 3) which contained iron in the +2 valence state.

Example 5

A total of four base gels were prepared. Each base gel contained: water, 4 liters; potassium chloride, 80 grams; guar gum, 28.8 grams; acetic acid, 0.4 ml; sodium carbonate, 0 grams; and a variable quantity of breaker activator 8 (BA 8). (See Breaker Activator Schedule.)

The density of the solution of potassium chloride in water was determined to be 8.436 pounds per gallon. Each base gel, with the exception of the addition of breaker activator, was prepared as described in the above general procedure.

For purposes of identification and future reference, the four base gels are assigned the numbers 1, 2, 3 and 4. A solution of BA 8 was added to each of base gels 2, 3 and 4. BA 8 solution was not added to base gel 1. BA 8 solution in the amount of 2.000 ml was added to base gel 2. BA 8 solution in the amount of 4.000 ml was added to base gel 3. BA 8 solution in the amount of 8.000 ml was added to base gel 4.

After addition of breaker activator solution, each base gel (then containing BA 8) was divided into 7 test gels, wherein each test gel contained 500 grams of base gel. Accordingly, 4 sets of 7 test gels per set were formed to thereby produce a total of 28 test gels.

A weighed quantity of lithium peroxide breaker was then added each one of the test gels. Seven different quantities (grams) of breaker were added as follows: 0.006, 0.015, 0.030, 0.045, 0.060, 0.120 and 0.480. Each test gel is identified herein by a combination of the base gel number, 1-4, and the grams of breaker in a test gel. For example, the four test gels having the identifying numbers 1.006, 2.006, 3.006 and 4.006 identify four specific test gels, one from base gel 1 containing 0.006 grams lithium peroxide, a second from base gel 2 containing 0.006 grams lithium peroxide, a third from base gel 3 containing 0.006 grams lithium peroxide, and a fourth from base gel 4 containing 0.006 grams lithium peroxide. The other 24 test gels are similarly identified.

After addition of breaker to each test gel, the breaker was allowed to become fully dispersed in the gel. At that point the pH of the gel was measured and a sufficient quantity of pH adjusting material was added to increase or decrease the pH of the gel to a value of about 9. Acetic acid was employed to decrease the pH. Sodium carbonate was employed to increase the pH. The nature and quantity of pH adjusting material added to each test gel is as follows.

Test gels 1.006 to 4.006: acetic acid, 0.00 ml; sodium carbonate, 0.14 grams.

Test gels 1.015 to 4.015: acetic acid, 0.00 ml; sodium carbonate, 0.05 grams.

Test gels 1.030 to 4.030: acetic acid, 0.01 ml; sodium carbonate, 0.03 grams.

Test gels 1.045 to 4.045: acetic acid, 0.04 ml; sodium carbonate, 0.05 grams.

Test gels 1.060 to 4.060: acetic acid, 0.05 ml; sodium carbonate, 0.06 grams.

Test gels 1.120 to 4.120: acetic acid, 2.88 ml; sodium carbonate, 0.12 grams.

Test gels 1.480 to 4.480: acetic acid, 3.84 ml; sodium carbonate, 0.13 grams.

At that point, the initial viscosity of each test gel was measured.

Viscosity Reduction Measurements

Two hundred (200) grams of each test gel were placed in a separate 8 ounce jar, the jars were sealed and placed in a constant-temperature water bath. Accordingly, there were a total of 28 jars. Jars containing gels from base gel 1 were placed in a 150° F. bath. Jars containing gels from base gel 2 were placed in a 125° F. bath. Jars containing gels from base gel 3 were placed in a 100° F. bath. Jars containing gels from base gel 4 were placed in a 75° F. bath. The viscosity of each gel in each jar was allowed to decline and the viscosity of each gel was measured at the end of each indicated interval of time. There were 10 time intervals.

By conventional calculation, it was determined that each of the four base gels contained about 59.55 pounds guar per 1000 gallons KCl solution, which included about 165.41 pounds of KCl per 1000 gallons KCl solution.

It was also calculated that each test gel contained in the range of from about 3.498 to about 3.504 grams of guar. As mentioned, each set of four test gels contained an identical quantity of breaker. The ratio of guar to breaker varied from set to set depending upon the weight of breaker in each set. Accordingly, there were seven different weight ratios of guar to breaker ranging from about 7.29 to about 582.91 weight parts guar per 1 weight part lithium peroxide breaker.

As previously noted, a different volume of BA 8 solution (note Breaker Activator Schedule) was added to each of base gels 2, 3 and 4. BA 8 was not added to base gel 1. It was calculated: that each test gel from base gel 1 contained 0 grams of Fe+2; that each test gel from base gel 2 contained about $0.3037 \times 10^{-3}$ grams Fe+2; and that each test gel from base gel 3 contained about $0.6072 \times 10$ grams Fe+2; and that each test gel from base gel 4 contained about $1.2132\ 10^{-3} \times$ grams Fe+2. Accordingly, it was calculated that the weight ratio of Fe+2 to breaker in each test gel ranged from about 0 to about 0.2022 weight parts Fe+2 per 1 weight part lithium peroxide.

Table 5, which contains parts A, B, C, D, E, F and G, reports the break schedule in terms of the percent of initial viscosity retained by each test gel at the end of each period of time.

TABLE 5

Percent of Initial Viscosity at End of Designated Period of Time
500 Grams of Base Gel

TABLE 5A $6 \times 10^{-3}$ grams Lithium Peroxide Breaker
0.102 pounds breaker per 1000 gal KCl solution
582.91 to 584.05 weight parts guar per 1 weight part breaker

| Test Gel No. | Grams BA 8 sol'n in test gel $\times 10^{-3}$ | Test Temp °F. | Grams Fe(II) in test gel $\times 10^{-3}$ | Time, minutes | | | | | | | | | |
|---|---|---|---|---|---|---|---|---|---|---|---|---|---|
| | | | | 30 | 60 | 90 | 120 | 150 | 180 | 240 | 300 | 360 | O.N. |
| 1.006 | 0 | 150 | 0 | 92 | 79 | 65 | 57 | 40 | 35 | 24 | 18 | 14 | 6 |
| 2.006 | 244.4 | 125 | 0.3037 | 55 | 25 | 16 | 13 | 11 | 11 | 8 | | | 4 |
| 3.006 | 488.5 | 100 | 0.6072 | 96 | 73 | 55 | 42 | 32 | 23 | 16 | 12 | | 3 |
| 4.006 | 976.1 | 75 | 1.2132 | 94 | 80 | 67 | 58 | 49 | 41 | 33 | 28 | | 5 |

TABLE 5B $15 \times 10^{-3}$ grams Lithium Peroxide
0.255 pounds breaker per 1000 gal KCl solution
233.16 to 233.62 weight parts guar per 1 weight part breaker

| Test Gel No. | Grams BA 8 sol'n in test gel $\times 10^{-3}$ | Test Temp F° | Grams Fe(II) in test $\times 10^{-3}$ | Time, minutes | | | | | | | | | |
|---|---|---|---|---|---|---|---|---|---|---|---|---|---|
| | | | | 30 | 60 | 90 | 120 | 150 | 180 | 240 | 300 | 360 | O.N. |
| 1.015 | 0 | 150 | 0 | 88 | 78 | 68 | 62 | 52 | 49 | 42 | 37 | 32 | 10 |
| 2.015 | 244.4 | 125 | 0.3037 | 46 | 24 | 16 | 11 | 9 | 8 | 5 | | | 4 |
| 3.015 | 488.5 | 100 | 0.6072 | 90 | 66 | 45 | 30 | 19 | 13 | 9 | 7 | | 2 |
| 4.105 | 976.1 | 75 | 1.2132 | 85 | 68 | 54 | 44 | 34 | 28 | 21 | 16 | | 3 |

TABLE 5C $30 \times 10^{-3}$ grams Lithium Peroxide
0.51 pounds breaker per 1000 gal KCl solution
116.58 to 116.81 weight parts guar per 1 weight part breaker

| Test Gel No. | Grams BA 8 sol'n in test gel × 10⁻³ | Test Temp ° F. | Grams Fe(II) in test gel × 10⁻³ | \multicolumn{10}{c}{Time, minutes} |
|---|---|---|---|---|---|---|---|---|---|---|---|---|
| | | | | 30 | 60 | 90 | 120 | 150 | 180 | 240 | 300 | 360 | O.N. |
| 1.030 | 0 | 150 | 0 | 85 | 58 | 37 | 29 | 22 | 20 | 17 | 15 | 13 | 8 |
| 2.030 | 244.4 | 125 | 0.3037 | 45 | 22 | 14 | 9 | 7 | 6 | 4 | | | 3 |
| 3.030 | 488.5 | 100 | 0.6072 | 78 | 50 | 27 | 16 | 10 | 8 | 5 | 4 | | 2 |
| 4.030 | 976.1 | 75 | 1.2132 | 82 | 62 | 46 | 35 | 25 | 20 | 13 | 12 | | 2 |

TABLE 5D $45 \times 10^{-3}$ grams Lithium Peroxide
0.765 pounds breaker per 1000 gal KCl solution
77.72 to 77.87 weight parts guar per 1 weight part breaker

| Test Gel No. | Grams BA 8 sol'n in test gel × 10⁻³ | Test Temp ° F. | Grams Fe(II) in test gel × 10⁻³ | 30 | 60 | 90 | 120 | 150 | 180 | 240 | 300 | 360 | O.N. |
|---|---|---|---|---|---|---|---|---|---|---|---|---|---|
| 1.045 | 0 | 150 | 0 | 84 | 58 | 37 | 29 | 22 | 20 | 17 | 15 | 13 | 8 |
| 2.045 | 244.4 | 125 | 0.3037 | 49 | 18 | 9 | 7 | 5 | 5 | | | | 3 |
| 3.045 | 488.5 | 100 | 0.6072 | 78 | 48 | 27 | 16 | 9 | 7 | 5 | 4 | | 2 |
| 4.045 | 976.1 | 75 | 1.2132 | 71 | 51 | 37 | 27 | 19 | 14 | 10 | 8 | | 2 |

TABLE 5E $60 \times 10^{-3}$ grams Lithium Peroxide
1.02 pounds breaker per 1000 gal KCl solution
58.29 to 58.41 weight parts guar per 1 weight part breaker

| Test Gel No. | Grams BA 8 soln in test gel × 10⁻³ | Test Temp ° F. | Grams Fe(II) in test gel × 10⁻³ | 30 | 60 | 90 | 120 | 150 | 180 | 240 | 300 | 360 | O.N. |
|---|---|---|---|---|---|---|---|---|---|---|---|---|---|
| 1.060 | 0 | 150 | 0 | 65 | 85 | 17 | 14 | 11 | 10 | 9 | 8 | 7 | 5 |
| 2.060 | 244.4 | 125 | 0.3037 | 47 | 14 | 8 | 6 | 4 | 4 | | | | 3 |
| 3.060 | 488.5 | 100 | 0.6072 | 73 | 39 | 20 | 12 | 7 | 6 | 4 | 3 | | 2 |
| 4.060 | 976.1 | 75 | 1.2132 | 73 | 49 | 33 | 23 | 16 | 13 | 8 | 6 | | 2 |

TABLE 5F $120 \times 10^{-3}$ grams Lithium Peroxide
2.04 pounds breaker per 1000 gal KCl solution
29.15 to 29.20 weight parts guar per 1 weight part breaker

| Test Gel No. | Grams BA 8 soln in test gel × 10⁻³ | Test Temp ° F. | Grams Fe(II) in test gel × 10⁻³ | 30 | 60 | 90 | 120 | 150 | 180 | 240 | 300 | 360 | O.N. |
|---|---|---|---|---|---|---|---|---|---|---|---|---|---|
| 1.120 | 0 | 150 | 0 | 61 | 25 | 16 | 14 | 11 | 10 | 9 | 8 | 8 | 5 |
| 2.120 | 244.4 | 125 | 0.3037 | 34 | 9 | 6 | 5 | 4 | 3 | | | | 4 |

TABLE 5F-continued

120 × 10⁻³ grams Lithium Peroxide
2.04 pounds breaker per 1000 gal KCl solution
29.15 to 29.20 weight parts guar per 1 weight part breaker

| Test Gel No. | Grams BA 8 soln in test gel × $10^{-3}$ | Test Temp °F. | Grams Fe(II) in test gel × $10^{-3}$ | Time, minutes | | | | | | | | | |
|---|---|---|---|---|---|---|---|---|---|---|---|---|---|
| | | | | 30 | 60 | 90 | 120 | 150 | 180 | 240 | 300 | 360 | O.N. |
| 3.120 | 488.5 | 100 | 0.6072 | 53 | 13 | 7 | 4 | 3 | 2 | | | | 2 |
| 4.120 | 976.1 | 75 | 1.2132 | 59 | 28 | 14 | 9 | 6 | 5 | 4 | 3 | | 2 |

TABLE 5G

480 × 10⁻³ grams Lithium Peroxide
8.16 pounds breaker per 1000 gal KCl solution
7.29 weight parts guar per 1 weight part breaker

| Test Gel No. | Grams BA 8 soln in test gel × $10^{-3}$ | Test Temp °F. | Grams Fe(II) in test gel × $10^{-3}$ | Time, minutes | | | | | | | | | |
|---|---|---|---|---|---|---|---|---|---|---|---|---|---|
| | | | | 30 | 60 | 90 | 120 | 150 | 180 | 240 | 300 | 360 | O.N. |
| 1.480 | 0 | 150 | 0 | 16 | 7 | 5 | 5 | 3 | 3 | | | | 2 |
| 2.480 | 244.4 | 125 | 0.3037 | 17 | 7 | 6 | 5 | | | | | | 4 |
| 3.480 | 488.5 | 100 | 0.6062 | 25 | 7 | 4 | 3 | 2 | | | | | 2 |
| 4.480 | 976.1 | 75 | 1.2132 | 28 | 10 | 6 | 5 | 3 | 2 | | | | 2 |

Example 5 demonstrates the decline in percent of initial viscosity of a gel with passage of time as influenced by variation of iron and breaker concentration and test temperature. In general, the percent of initial viscosity after a period of time in the range of from about four hours to about 24 hours was substantially the same for each test gel regardless of iron and breaker concentration and test temperature. However, the specific elapsed time required for each test gel to attain the final value was strongly dependent upon the variation in iron and breaker concentration and test temperature. The seven test gels containing no iron required the greatest amount of time to attain the final value regardless of variation in breaker concentration even though these tests were conducted at the highest temperature (150 degrees F.). The seven test gels subjected to a test temperature of 125 degrees F. attained the final value in an elapsed time of about four hours regardless of variation in iron and breaker concentration.

The percent of initial viscosity, with the ratios of iron to breaker and guar to breaker being held constant, uniformly declines with increase in time. Also, the percent of initial viscosity, with time and temperature being constant, declines with increase in breaker concentration regardless of variation in iron concentration.

The results demonstrate the flexibility of the system of variables to achieve a desired constant result. For example, a desired percent of initial viscosity can be obtained by selection of the two chemical variables and the time and temperature conditions. In this regard, data specifically included in Tables 5B-5F shows that a value of nine percent of initial viscosity can be obtained by employing nine different combinations of temperature, time, breaker concentration and iron concentration, wherein the temperatures range from the lowest to the highest and the break times range from one hour to four hours.

Example 6

A gel was prepared as follows. The gel contained 4 liters of water, 80 grams of potassium chloride, 28.4 grams of guar gum, 2.4 ml acetic acid, 0.2 grams of sodium carbonate and 0.96 grams of lithium peroxide breaker.

The density of the solution of potassium chloride in water was determined to be 8.436 pounds per gallon.

Preparation of Gel

The gel was prepared as described in the above general procedure. The only difference between the general procedure and the procedure in this example was that 1.00 milliliter of acetic acid was added to the dispersion prior to the addition of breaker. After the addition of breaker, the pH of the gel was measured and 1.4 milliliters of acetic acid and 0.20 grams of sodium carbonate were added to decrease the pH of the gel to a value of 9.0.

It was determined by conventional calculation that the gel contained about 58.72 pounds guar per 1000 gallons KCl solution, which included about 165.41 pounds of KCl per 1000 gallons KCl solution. It was also determined that the breaker concentration was about 1.985 pounds breaker per 1000 gallons KCl solution and that the weight ratio of guar to breaker was about 29.58 weight parts guar per one weight part breaker.

Example 6A

Two weighed quantities of breaker activator 6 (BA 6) solution, as described in the Breaker Activator Schedule, were added to 449.92 grams of walnut hulls having a particle size of 20/30 mesh US Sieve Series. The first quantity of BA 6 solution weighed 85.6 grams. The second quantity of BA 6 solution weighed 35.43 grams.

The addition of each quantity of BA 6 solution to the hulls was performed while the mixture of breaker activator solution and walnut hulls was stirred with a Kitchen Aid mixer equipped with a paddle attachment. After the addition of each quantity of BA 6 solution, the solution was permitted to be adsorbed on the hulls, and then the mixture was heated for two hours at 225° F. to evaporate water introduced as part of the solution. The dried product, referred to herein as the "BA 6 Hulls," weighed about 471.1 grams.

Calculations regarding BA 6, which contains iron (III), can be performed in accordance with the Breaker Activator Schedule-Recipe. It was calculated that the BA 6 hulls included about 21.18 grams (4.496 weight percent) BA 6 and 2.396 grams iron (III).

Example 6B

Two weighed quantities of breaker activator 7 (BA 7) solution, as described in the Breaker Activator Schedule, were added to 451.89 grams of walnut hulls having a particle size of 20/30 mesh US Sieve Series. The first quantity of BA 7 solution weighed 82.22 grams. The second quantity of BA 7 solution weighed 40.96 grams.

The addition of each quantity of BA 7 solution to the hulls was performed while the mixture of breaker activator solution and walnut hulls was stirred with a Kitchen Aid mixer equipped with a paddle attachment. After the addition of each quantity of BA 7 solution, the solution was permitted to be adsorbed on the hulls, and then the mixture was heated for two hours at 225° F. to evaporate the water introduced as part of the solution. The dried product, referred to herein as the "BA 7 Hulls," weighed about 474.43 grams.

Calculations regarding BA 7, which contains iron (II), can be performed in accordance with the Breaker Activator Schedule-Recipe. It was calculated that the BA 7 hulls included about 22.542 grams (4.751 weight percent) BA 7 and 2.436 grams iron (II).

Viscosity Reduction

Two hundred grams of the prepared gel were placed in each one of 11 separate 8 ounce jars. One jar contained gel and lithium peroxide, but did not contain any BA 6 Hulls nor any BA 7 Hulls. For purposes of this disclosure, the jar containing no breaker activator is designated Test 0.

Five jars contained gel, lithium peroxide and BA 6 Hulls. For purposes of this disclosure, the jars containing BA 6 Hulls are designated Test 6-1, Test 6-2, Test 6-3, Test 6-4 and Test 6-5.

Five jars contained gel, lithium peroxide and BA 7 Hulls. For purposes of this disclosure, the jars containing BA 7 Hulls are designated Test 7-1, Test 7-2, Test 7-3, Test 7-4 and Test 7-5.

The quantities of BA 6 Hulls and BA 7 Hulls added to the test gels are set forth in Table 6A which also includes information pertaining to the content of the test gels.

TABLE 6A

Walnut Hulls Having Adsorbed Breaker Activator

| Test | Gel grams | Guar grams | Breaker mg | BA Hulls mg | BA mg | Fe mg | Wt. Ratio Guar to Breaker | Wt. Ratio Fe to Breaker $\times 10^{-3}$ |
|---|---|---|---|---|---|---|---|---|
| 0 | 200 | 1.381 | 46.692 | 0.000 | 0.000 | 0.000 | 29.583 | 0.000 |
| 6-1 | 200 | 1.381 | 46.692 | 24.000 | 1.079 | 0.122 | 29.583 | 2.614 |
| 6-2 | 200 | 1.381 | 46.692 | 48.000 | 2.158 | 0.244 | 29.583 | 5.227 |
| 6-3 | 200 | 1.381 | 46.692 | 96.000 | 4.316 | 0.488 | 29.583 | 10.455 |
| 6-4 | 200 | 1.381 | 46.692 | 144.000 | 6.474 | 0.732 | 29.583 | 15.682 |
| 6-5 | 200 | 1.381 | 46.692 | 192.000 | 8.632 | 0.976 | 29.583 | 20.910 |
| 7-1 | 200 | 1.381 | 46.692 | 24.000 | 1.140 | 0.123 | 29.583 | 2.639 |
| 7-2 | 200 | 1.381 | 46.692 | 48.000 | 2.281 | 0.246 | 29.583 | 5.279 |
| 7-3 | 200 | 1.381 | 46.692 | 96.000 | 4.561 | 0.493 | 29.583 | 10.557 |
| 7-4 | 200 | 1.381 | 46.692 | 144.000 | 6.842 | 0.739 | 29.583 | 15.836 |
| 7-5 | 200 | 1.381 | 46.692 | 192.000 | 9.123 | 0.986 | 29.583 | 21.115 |

The iron content of BA 7 Hulls having adsorbed Fe (II) is slightly more than the iron content BA 6 Hulls having adsorbed Fe (III).

The jars containing the test gels were sealed, shaken and allowed to stand at room temperature. The viscosity of each gel was allowed to decline and the viscosity of each gel was measured at the end of each indicated interval of time.

Table 6B reports the break schedule in terms of the percent of initial viscosity retained by each gel tested at the end of each period of time.

TABLE 6B

Reducing the Viscosity of a Gel with a
Breaker and a Breaker Activator Adsorbed on Walnut Hulls
Room Temperature

| Test Gel No. | Weight Ratio: Iron to Breaker mg/gram | Percent of Initial Viscosity Time, minutes | | | | | | | | | |
|---|---|---|---|---|---|---|---|---|---|---|---|
| | | 30 | 60 | 90 | 120 | 180 | 240 | 300 | 360 | 420 | O.N. |
| 0 | 0 | 100 | 99.3 | 98.5 | 97.9 | 97.7 | 97.0 | 96.4 | 96.0 | 96.5 | 93.9 |
| BREAKER ACTIVATOR 6 Containing Iron (III) | | | | | | | | | | | |
| 6-1 | 2.614 | 96.5 | 91.0 | 86.6 | 82.5 | 76.5 | 66.9 | 59.9 | 53.3 | 47.5 | 8.1 |
| 6-2 | 5.227 | 91.9 | 77.9 | 68.5 | 60.4 | 48.5 | 34.1 | 25.8 | 19.5 | 15.6 | 3.3 |
| 6-3 | 10.455 | 87.8 | 55.7 | 42.0 | 31.5 | 20.9 | 13.0 | 9.9 | 8.0 | 6.6 | 2.2 |
| 6-4 | 15.682 | 83.7 | 47.8 | 22.9 | 16.6 | 11.5 | 7.7 | 6.1 | 5.0 | 4.3 | 1.9 |
| 6-5 | 20.910 | 83.3 | 37.7 | 15.5 | 11.6 | 8.4 | 5.7 | 4.4 | 3.7 | — | — |

TABLE 6B-continued

Reducing the Viscosity of a Gel with a
Breaker and a Breaker Activator Adsorbed on Walnut Hulls
Room Temperature

| Test Gel No. | Weight Ratio: Iron to Breaker mg/gram | Percent of Initial Viscosity Time, minutes | | | | | | | | |
|---|---|---|---|---|---|---|---|---|---|---|
| | | 30 | 60 | 90 | 120 | 180 | 240 | 300 | 360 | 420 | O.N. |
| BREAKER ACTIVATOR 7 Containing Iron (II) | | | | | | | | | | | |
| 7-1 | 2.639 | 92.7 | 87.2 | 80.7 | 75.0 | 67.1 | 54.3 | 44.8 | 37.4 | 30.7 | 5.1 |
| 7-2 | 5.279 | 90.9 | 74.9 | 64.5 | 55.4 | 43.4 | 28.5 | 20.6 | 15.5 | 12.4 | 3.0 |
| 7-3 | 10.557 | 83.4 | 53.2 | 37.8 | 27.8 | 18.2 | 10.6 | 8.0 | 6.5 | 5.4 | 2.2 |
| 7-4 | 15.836 | 87.7 | 51.1 | 23.2 | 15.9 | 10.8 | 6.9 | 5.2 | 4.4 | 3.9 | 2.1 |
| 7-5 | 21.115 | 85.8 | 29.8 | 17.1 | 11.9 | 8.1 | 5.2 | 4.1 | 3.6 | — | — |

The results from Table 6B indicate that the combination of lithium peroxide breaker and walnut hulls having a breaker activator adsorbed thereon causes the viscosity of a guar gel to reduce at a rate greater than the rate with lithium peroxide alone. The results further show that percent of initial viscosity declines with passage of time, and with increase in ratio of iron to breaker at constant room temperature. The rate of viscosity decline obtained with hulls having iron(II) adsorbed thereon was substantially the same as the hulls having iron (III) adsorbed thereon.

In contrast, notice that the results reported in Tables 4A and 4B, for a test temperature of 100 degrees F., that iron in the +3 valence state, produced a higher rate of viscosity reduction than iron in the +2 valence state.

Example 7

Viscosity Decline of Cross linked Guar Gel over Designated Periods of Time

Four cross linked gels were prepared. The change in viscosity of each of the four gels was determined by measuring the apparent viscosity of equal quantities of each gel over designated periods of time. Accordingly, 78 milliliter samples of cross linked gel were taken from each of the four cross linked gels to form four test gels 8-1, 8-2, 8-3 and 8-4. The sampled material was tested to determine the viscosity of each test gel at a given time.

Preparation of Cross linked Gel

Each cross linked gel contained: 750 milliliters of tap water; 15 grams of potassium chloride; 2.7 grams of guar gum; 0.15 milliliters of acetic acid; 0.075 milliliters of nonyl phenol; 0.045 grams of lithium peroxide; 0.2 grams of an aqueous solution of 18 weight percent lithium hydroxide monohydrate in DI water (LiOH.H$_2$O); 0.95 milliliters of cross linking agent; and from 0 to 1.5 milliliters of breaker activator 8 solution (BA 8 solution).

The first gel contained 0 milliliters of BA 8 solution (test gel 8-1); the second gel contained about 0.375 milliliters of BA 8 solution (test 8-2); the third gel contained about 0.750 milliliters of BA 8 solution (test gel 8-3); and the fourth test gel contained about 1.50 milliliters of BA 8 solution (test gel 8-4). Example A, Breaker Activator Schedule—Recipe, and Example A, Breaker Activator Schedule—Observations, provide information pertaining to the preparation and properties of Breaker Activator 8.

The cross linking agent utilized was prepared by dissolving 3.0 grams of POLYBOR in 30.33 grams of DI water. POLYBOR is a trademarks of US Borax Inc. for di-sodium octaborate tetrahydrate (Na$_2$B$_8$O$_{13}$.4H$_2$O). The reported molecular weight of the cross linking agent is 412.52, and the measured density was 8.75 pounds of POLYBOR solution per gallon of POLYBOR solution.

The nonyl phenol ingredient is believed to have functioned as a surfactant. The lithium hydroxide monohydrate ingredient is believed to have functioned as a pH adjusting material. The guar gum employed was Guar 8000 available from Economy Polymers. Lithium peroxide is a gel breaker.

Each cross linked gal was prepared as follows. The tap water was added to the jar of a 1 liter Waring blender. The blender was activated and the mixing rate was adjusted to form a vortex in the water. The potassium chloride was then added to the operating blender and allowed to dissolve in the water. Thereafter, the guar was slowly added to the vortex in the operating blender and allowed to disperse in the aqueous solution. After the guar was fully dispersed, the acetic acid and nonyl phenol were added to the mixture in the blender and mixing was continued until the guar was fully hydrated to form a gel. The gel breaker and pH adjusting material were added to the formed gel and allowed to become fully dispersed therein. Thereafter, the mentioned quantity of breaker activator was added to the gel, and, lastly, the cross linking agent was added to the gel which was mixed until the gel began to thicken.

By conventional calculation, it was determined that each of the four cross linked gels in Example 7 contained about 29.77 pounds guar per 1000 gallons KCl solution, which included about 165.41 pounds of KCl per 1000 gallons KCl solution. Each gel contained about 0.496 pounds of breaker per 1000 gallons KCl solution. The weight ratio of guar to breaker was, thus, about 60 pounds guar per pound breaker.

Viscosity Measurements

The test equipment employed was a Model 1000 High Pressure, High Temperature viscometer available from OFI Testing Equipment Inc. The viscometer was equipped with a B2 bob. The apparent viscosity of the gel was calculated from n and K' values determined from a power law model using shear stress data generated by the equipment at 100, 150, 200, 250 and 300 rpm.

Using a syringe, about 78 milliliters of cross linked gel was transferred to the cup of the viscometer. The cup was threaded into the viscometer and the test sample was pressurized to 100 psi with nitrogen. The test was begun at a temperature of 75° F. and the temperature increased to 100° F. in about 12 minutes.

The test results are shown in Tables 7A and 7B. The quantities of Breaker activator 8 and the ratio of Fe (II) to lithium peroxide are set forth in Table 7A. Table 7A also includes the calculated value of the initial apparent viscosity of each of test gels 8-1 to 8-4.

TABLE 7A

LITHIUM PEROXIDE AND BREAKER ACTIVATOR 8 AT 100° F.

| | | Test Gel | | | |
|---|---|---|---|---|---|
| Item | Description | 8-1 | 8-2 | 8-3 | 8-4 |
| 1 | BA 8-sol'n milliliters | 0.0000 | 0.3750 | 0.7500 | 1.5000 |
| 2 | BA 8-sol'n gallons per 1000 gallons KCl solution | 0.0000 | 0.4955 | 0.9910 | 1.9821 |
| 3 | BA 8-sol'n grams | 0.0000 | 0.3768 | 0.7536 | 1.5071 |
| 4 | BA 8-solid milligrams | 0.0000 | 4.3330 | 8.6660 | 17.3320 |
| 5 | Fe (II) milligrams per gram Lithium Peroxide | 0.0000 | 10.4060 | 20.8119 | 41.6239 |
| 6 | Apparent Viscosity initial value 0 minutes 100/s | 2053.0000 | 2025.0000 | 1986.0000 | 1903.0000 |

Notes:
1. The values in item 1 were experimental quantities employed in Example 7.
2. The values in items 2-5 are calculated numbers based experimental quantities employed in Example 7.
3. The values in item 6 are calculated initial apparent viscosities based on data obtained during the viscosity measurement procedure employed in Example 7. The initial apparent viscosity decreased as the ratio of Fe (II) to lithium peroxide breaker increased.

Table 7B reports viscosity retention as a percent of calculated values of apparent viscosity of each of test gels 8-1 to 8-4 over the test period.

TABLE 7B

LITHIUM PEROXIDE AND BREAKER ACTIVATOR 8 AT 100° F.

| | Percent of Initial Apparent Viscosity | | | |
|---|---|---|---|---|
| Time minutes | Test Gel 8-1 | Test Gel 8-2 | Test Gel 8-3 | Test Gel 8-4 |
| 5 | 88.31 | 82.77 | 94.96 | 96.58 |
| 10 | 86.99 | 86.72 | 92.80 | 74.04 |
| 15 | 79.20 | 80.99 | 79.41 | 58.01 |
| 20 | 78.28 | 71.60 | 64.75 | 45.51 |
| 25 | 73.55 | 62.37 | 57.30 | 37.68 |
| 30 | 76.96 | 59.60 | 52.01 | 33.26 |
| 35 | 73.31 | 56.10 | 44.66 | 27.96 |
| 40 | 74.57 | 51.51 | 40.08 | 23.86 |
| 45 | 69.41 | 49.19 | 37.21 | 18.97 |
| 50 | 68.63 | 45.83 | 35.15 | 15.19 |
| 55 | 69.12 | 45.58 | 33.69 | 11.51 |
| 60 | 69.02 | 43.95 | 32.23 | 9.35 |
| 65 | 72.63 | 42.27 | 30.82 | 7.72 |
| 70 | 66.34 | 40.79 | 29.10 | 6.73 |
| 75 | 69.90 | 39.80 | 28.00 | 5.25 |
| 80 | 69.85 | 38.02 | 25.98 | 4.36 |
| 85 | 69.51 | 36.10 | 23.51 | 3.68 |
| 90 | 64.54 | 34.12 | 21.05 | 3.15 |
| 95 | 63.81 | 33.73 | 18.32 | 3.26 |
| 100 | 59.28 | 32.79 | 16.52 | 2.89 |
| 105 | 60.69 | 32.05 | 14.90 | 2.89 |
| 110 | 60.01 | 30.77 | 13.75 | 3.26 |
| 115 | 61.81 | 29.73 | 12.64 | 2.47 |
| 118 | 59.33 | 29.33 | 12.03 | 2.70 |
| 128 | 60.84 | 27.16 | 9.87 | |
| 138 | 56.89 | 23.16 | 7.91 | |
| 148 | 55.48 | 20.40 | 6.29 | |
| 158 | 56.02 | 18.77 | 4.38 | |
| 168 | 53.48 | 16.99 | 3.27 | |
| 178 | 51.58 | 15.11 | 2.27 | |
| 188 | 51.14 | 13.09 | 1.86 | |
| 198 | 50.12 | 11.11 | | |
| 208 | 49.59 | 9.88 | | |
| 218 | 49.39 | 9.04 | | |

TABLE 7B-continued

LITHIUM PEROXIDE AND BREAKER ACTIVATOR 8 AT 100° F.

| | Percent of Initial Apparent Viscosity | | | |
|---|---|---|---|---|
| Time minutes | Test Gel 8-1 | Test Gel 8-2 | Test Gel 8-3 | Test Gel 8-4 |
| 228 | 46.57 | 8.20 | | |
| 238 | 48.32 | 7.51 | | |

Table 7B shows that the percent of initial apparent viscosity of a cross linked gel decreases with increase in iron to breaker ratio at constant time and temperature. Table 7B also shows that the percent of initial apparent viscosity of a cross linked gel decreases with passage of time at constant iron to breaker ratio and constant temperature.

Example 8

Two guar gels containing breaker, but no breaker activator, were permitted to undergo a decline in viscosity for a time sufficient to enable each gel to approach a value of less than one percent of the initial viscosity of each gel. Two hundred grams of each gel, designated herein as Gel A and Gel B, were placed in a separate 8 ounce jar, and the viscosity of each gel was measured at the end of a designated period of time as described in the general description of Examples 1-4.

Each of Gels A and B were prepared as described in the General Method of Gel Preparation. Gel A is the same as Gel 1 of Example 1. Accordingly, Gel A contains about 59.55 pounds of guar per 1000 gallons of KCL solution and about 60 pounds of guar per pound of lithium peroxide breaker. Gel B is the same as the gels in Examples 3A and 3B containing no breaker activator. Accordingly, Gel B contains about 59.55 pounds of guar per 1000 gallons of KCL solution and about 30 pounds of guar per pound of lithium peroxide breaker. Gel B thus contained twice as much breaker as Gel A.

Gel A was maintained at room temperature during the entire test period. Gel B was maintained at 100° F. during the entire test period.

Table 8 reports the break schedule in terms of the percent of initial viscosity retained by each gel at the end of each period of time.

TABLE 8

Long Term Testing

| TEST TIME | | Gel A<br>Breaker only no<br>Breaker Activator | Gel B<br>Breaker only no<br>Breaker Activator |
|---|---|---|---|
| | | Viscosity as Percent of Initial Viscosity | |
| | | TEST TEMPERATURE | |
| Hours | Days | Room Temp | 100° F. |
| 0 | 0 | 100.00 | 100.00 |
| 21 | 0.875 | 84.00 | 73.80 |
| 45 | 1.875 | 67.70 | 51.50 |
| 69 | 2.875 | 56.00 | 38.90 |
| 93 | 3.875 | 47.40 | 29.60 |
| 117 | 4.875 | 41.00 | 25.30 |
| 141 | 5.875 | 35.70 | 20.90 |
| 165 | 6.875 | 14.80 | 18.90 |
| 189 | 7.875 | 12.30 | 15.23 |
| 213 | 8.875 | 10.10 | 12.30 |
| 237 | 9.875 | 9.40 | 10.90 |
| 261 | 10.875 | 9.10 | 9.80 |
| 285 | 11.875 | 8.50 | 8.20 |
| 309 | 12.875 | 2.70 | 2.70 |
| 333 | 13.875 | 0.90 | 0.90 |
| 357 | 14.875 | 0.60 | 0.40 |

The data in Table 8 indicates that each gel, regardless of the difference in test temperature and the difference in breaker concentration, required about 12 to 13 days to achieve a viscosity value of less than one percent of the initial viscosity of each gel. The data also indicates that each gel required about 9 to 10 days to achieve a viscosity value of about 10 percent of the initial viscosity of each gel.

The rate of viscosity decline for Gel B, which contained the higher concentration of breaker, and which was maintained at a higher test temperature, was higher than that of Gel A for about 6 days.

Table 9, below, is a selection of experimental and calculated data and results produced in Example A and each of Examples 1-8. For more specific information, consult the description of each example and the break schedule developed for such example. The calculated data in Table 9 can be produced from the experimental quantities disclosed in each example by any person skilled in the art of performing chemical calculations.

TABLE 9

| ITEM | EXAMPLE | | | | | | | | | |
|---|---|---|---|---|---|---|---|---|---|---|
| | 1 | 2 | 3A | 3B | 4A | 4B | 5 | 6 | 7 | 8 |
| Lbs Guar per 1000 gal KCl sol'n | 59.55 | 59.55 | 59.55 | 59.55 | 59.55 | 59.55 | 59.55 | 58.72 | 29.77 | 59.55 |
| Lbs KCl per 1000 gal KCl sol'n | 165.41 | 165.41 | 165.41 | 165.41 | 165.41 | 165.41 | 165.41 | 165.41 | 165.41 | 165.41 |
| Brkr | LP, AP, CP, SPC | LP | LP | LP | LP | LP | LP | LP | LP | LP |
| Lbs Brkr per 1000 gal KCl sol'n | 0.99 | 1.98 | 1.98 | 1.98 | 1.98 | 1.98 | 0.102 to 8.16 | 1.99 | 0.50 | 0.99 1.98 |
| Lbs Guar per Lb Brkr | 60.00 | 30.00 | 30.00 | 30.00 | 30.00 | 30.00 | 7.29 to 584.05 | 29.58 | 60.00 | 60.00 to 30.00 |
| BA | none | BA 1, BA 2, BA 3, BA 4, BA 5 | BA 3a, BA 3b, BA 3c, BA 3d, BA 3e | BA 3a, BA 3b, BA 3c, BA 3d, BA 3e | BA 2 | BA 3 | BA 8 | BA 6 BA 7 | BA 8 | none |
| Lbs BA per Lb Brkr ×10⁻³ | 0.00 | 220.00 | 43.00 | 43.00 to 170.00 | 28.00 to 443.00 | 28.00 to 446.00 | 0.00 to 1870.90 | 23.11 to 195.38 | 96.29 to 385.15 | 0.00 |
| M | none | Cu (II), Fe (III), Fe (II), Mn (II), Co (II) | Fe (II) | Fe (II) | Fe (III) | Fe (II) | Fe (II) | Fe (III), Fe (II) | Fe (II) | none |

TABLE 9-continued

| | EXAMPLE | | | | | | | | | |
|---|---|---|---|---|---|---|---|---|---|---|
| ITEM | 1 | 2 | 3A | 3B | 4A | 4B | 5 | 6 | 7 | 8 |
| Lbs M per lb Brkr ×10$^{-3}$ | 0.00 | 23.56 to 26.89 | 1.57 to 6.18 | 6.176 to 6.363 | 3.128 to 50.051 | 3.011 to 48.169 | 0 to 202.2 | 2.614 to 21.115 | 10.406 to 41.624 | 0.00 |
| Test Temp F.° | RT | 100 | 100 | 100 | 100 | 100 | 75 to 150 | RT | 75 to 100 | RT, 100 |
| Hours to 10% of initial viscosity | 19.78 to >21 | 0.67 to >21 | 2.5 to 14.04 | 2.4 to 2.5 | 0.46 to 1.89 | 0.49 to 4.75 | 0.83 to 21 | 2.5 to 20.32 | 0.97 to 3.45 | 216.43 to 256.64 |

Table 10, below, is a compilation of results from Examples 2-7 for viscosity reduction tests performed at a contact temperature of 100° F. utilizing iron (II) and iron (III). Subject to the comments contained in foot notes 2, 3 and 4, the gels employed in the reported results had a constant weight ratio of guar to breaker of about 30 to 1.

Comparison of the results reported in Table 10 for Examples 2, 3A, 3B, 4A, 4B, 5, 6A and 6B with the results shown for Gel B in Example 8 reveals that the contact time was reduced by about 95 to about 99 percent by addition of an amount of iron in the range of from about 0.16 to about 5 percent of the weight of the breaker.

Comparison of the results reported in Table 10 for Example 7 with the results shown for Gel A in Example 8 reveals that the contact time for a cross-linked gel when compared to a gel which was not cross-linked (each base gel having a guar to breaker ratio of about 60 to 1) was reduced by about 98 to about 99 percent by addition of an amount of iron in the range of from about 1 to about 4 percent of the weight of the breaker and by increasing the contact temperature from about room temperature to about to 100° F.

For more specific information, consult the description of each example and the break schedule developed for such example. The calculated data in Table 10 can be produced from the experimental quantities disclosed in each example by any person skilled in the art of performing chemical calculations.

TABLE 10

VISCOSITY REDUCTION TIME
Viscous Fluids contacted with compositions containing
Lithium Peroxide breaker and Fe$_y$Na$_x$EDTA breaker activator
Weight Ratio: 30 lbs Guar per 1 lb breaker. (See footnotes 2, 3 and 4.)
Contact Temperature: 100° F.

| | | Breaker Activator as a dissolved ingredient of an aqueous solution lbs Fe/lb Breaker ×10$^{-3}$ (fn 2) | | Breaker Activator as an ingredient of a solid deposited on substrate lbs Fe/lb Breaker ×10$^{-3}$ (fn 3) | | Breaker Activator as a dissolved ingredient of an aqueous solution lbs Fe/lb Breaker ×10$^{-3}$ (fn 4) |
|---|---|---|---|---|---|---|
| Example | Contact Time hours (fn 1) | Fe (II) | Fe (III) | Fe (II) | Fe (III) | Fe (II) |
| 4A | 0.46 | | 50.051 | | | |
| 4B | 0.49 | 48.169 | | | | |
| 2 | 0.67 | 24.084 | | | | |
| 7 | 1.03 | | | | | 41.6239 |
| 5 | 1.25 | 5.1 | | | | |
| 2 | 1.31 | | 25.026 | | | |
| 4A | 1.89 | | 3.128 | | | |
| 3B | 2.43 | 6.244 | | | | |
| 3A | 2.50 | 6.181 | | | | |
| 6B | 2.50 | | | 21.1147 | | |
| 6A | 2.50 | | | | 20.9098 | |
| 7 | 3.45 | | | | | 10.406 |
| 4B | 4.75 | 3.011 | | | | |
| 3A | 14.04 | 1.574 | | | | |
| 6B | 18.32 | | | 2.6386 | | |
| 6A | 20.32 | | | | 2.6137 | |

Having described the invention that which is claimed is:

1. A method for reducing the viscosity of a viscous fluid, said method being comprised of the steps of:

contacting said viscous fluid, which is comprised of an aqueous liquid containing a gelling agent, with a water soluble material selected from one of lithium peroxide and a combination of lithium peroxide with a metal-containing compound, wherein said lithium peroxide is enclosed within a membrane which is water permeable and water insoluble, and maintaining said contacting for a time and at a temperature sufficient to reduce the viscosity of said viscous fluid;

said metal-containing compound is represented by the general formula:

$$M_y Na_x EDTA$$

wherein, M is selected from chromium (II), chromium (III), copper (II), iron (II), iron (III), manganese (II), cobalt (II), nickel (II) and zinc (II), Na is sodium, EDTA represents the anion of ethylenediaminetetraacetic acid, y has a value in the range of from about 0.25 to about 2.0; x is greater than 0 and less than 4 and has a value equal to (4-ny) and n is the valence of M.

2. The method of claim 1 wherein said water soluble material is said lithium peroxide enclosed within a membrane which is water permeable and water insoluble.

3. The method of claim 2 wherein the weight ratio of said lithium peroxide to said aqueous liquid is in the range of from about 0.1 to about 8.5 pounds of said lithium peroxide per 1000 gallons of said aqueous liquid.

4. The method of claim 1 wherein the weight ratio of said lithium peroxide to said aqueous liquid is in the range of from about 0.1 to about 8.5 pounds of said lithium peroxide per 1000 gallons of said aqueous liquid.

5. The method of claim 1 wherein said water soluble material is said combination of said lithium peroxide with said metal-containing compound.

6. The method of claim 5 wherein the weight ratio of said metal in said metal-containing compound to said lithium peroxide is an amount in the range of from about $1 \times 10^{-3}$ to about $210 \times 10^{-3}$ pounds of said metal per pound of said lithium peroxide.

7. The method of claim 5 wherein the weight ratio of said lithium peroxide to said aqueous fluid is in the range of from about 0.1 to about 8.5 pounds of said lithium peroxide per 1000 gallons of said aqueous liquid.

8. The method of claim 7 wherein the weight ratio of said metal in said metal-containing compound to said lithium peroxide is an amount in the range of from about $1 \times 10^{-3}$ to about $210 \times 10^{-3}$ pounds of said metal per pound of said lithium peroxide.

9. The method of claim 8 wherein said metal, M, is selected from the group consisting of Cu(II), Fe(III), Fe(II), Mn(II) and Co(II) and the weight ratio of said gelling agent to said lithium peroxide is in the range of from about 5 to about 600 weight parts of said gelling agent per 1 weight part of said lithium peroxide.

10. The method of claim 9 wherein said metal, M, is selected from iron (II) and iron (III).

11. The method of claim 1 wherein said temperature is in the range of from about room temperature to about 180° F. and said time is in the range of from about 25 minutes to 11 days.

12. The method of claim 11 wherein said temperature is in the range of from about room temperature to about 125° F. and said time is in the range of from about 25 minutes to about 14 hours.

13. The method of claim 1 wherein said gelling agent is guar present in said aqueous liquid in an amount in the range of from about 25 to about 60 pounds of said guar per 1000 gallons of said aqueous liquid.

14. The method of claim 1, wherein said metal-containing compound is in the form of a dry coating on a solid substrate.

15. A method for reducing the viscosity of a viscous fluid, said method being comprised of the steps of:

contacting said viscous fluid, which is comprised of an aqueous liquid containing a gelling agent, with a water soluble material, wherein said water soluble material is a combination of lithium peroxide with a metal-containing compound, wherein said metal-containing compound is in the form of a dry coating on a solid substrate, and maintaining said contacting for a time and at a temperature sufficient to reduce the viscosity of said viscous fluid;

said metal-containing compound is represented by the general formula:

$$M_y Na_x EDTA$$

wherein, M is selected from chromium (II), chromium (III), copper (II), iron (II), iron (III), manganese (II), cobalt (II), nickel (II) and zinc (II), Na is sodium, EDTA represents the anion of ethylenediaminetetraacetic acid, y has a value in the range of from about 0.25 to about 2.0; x is greater than 0 and less than 4 and has a value equal to (4-ny) and n is the valence of M.

* * * * *